(12) United States Patent
Takeda et al.

(10) Patent No.: US 7,173,375 B2
(45) Date of Patent: Feb. 6, 2007

(54) VEHICULAR LAMP

(75) Inventors: Hitoshi Takeda, Shizuoka-ken (JP); Masayasu Ito, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 35 days.

(21) Appl. No.: 10/799,855

(22) Filed: Mar. 12, 2004

(65) Prior Publication Data
US 2004/0179366 A1     Sep. 16, 2004

(30) Foreign Application Priority Data
Mar. 14, 2003   (JP)   ............... 2003-070916

(51) Int. Cl.
*B60Q 1/00*   (2006.01)
(52) U.S. Cl. .................. 315/77; 315/82; 315/291; 362/464; 362/276; 382/104
(58) Field of Classification Search ................ 362/464, 362/276; 382/104; 315/77, 82, 291; 317/77
See application file for complete search history.

(56) References Cited

U.S. PATENT DOCUMENTS

2001/0019486 A1    9/2001    Thominet
2002/0047533 A1*   4/2002    Fushimi et al. ............... 315/82
2003/0123705 A1*   7/2003    Stam et al. .................. 382/104
2004/0036418 A1*   2/2004    Rooke et al. ................. 315/77
2004/0178737 A1    9/2004    Takeda et al.
2004/0179367 A1    9/2004    Takeda et al.
2004/0179368 A1    9/2004    Takeda et al.

FOREIGN PATENT DOCUMENTS

JP        2002-231014       8/2002

* cited by examiner

*Primary Examiner*—Don Wong
*Assistant Examiner*—Binh Van Ho
(74) *Attorney, Agent, or Firm*—Fish & Richardson P.C.

(57) ABSTRACT

A vehicular lamp used for a vehicle, includes a semiconductor light emitting element for generating light to be emitted by the vehicular lamp and a current controlling unit for changing a current supplied to the semiconductor light emitting element based on the speed of the vehicle. The current controlling unit may reduce the current, if the speed of the vehicle is lower than a predetermined speed. The current controlling unit may reduce the current, if the vehicle is stopped.

4 Claims, 13 Drawing Sheets

VEHICULAR LAMP

The present application claims priority from a Japanese Patent Application No. 2003-070916 filed on Mar. 14, 2003, the contents of which are incorporated herein by reference.

BACKGROUND OF THE INVENTION

1. Field of the Invention

The present invention relates to a vehicular lamp. More particularly, the present invention relates to a vehicular lamp for use in a vehicle.

2. Description of the Related Art

So far, a vehicular lamp using a semiconductor light emitting element has been known (c.f. Patent Document 1). Recently, it has been discussed that the semiconductor light emitting element is used as a light source of a vehicular headlamp as disclosed, for example, in Japanese Patent Application Publication Laid-Open No. 2002-231014.

The temperature in a lamp chamber of the vehicular headlamp, however, might be significantly increased by the radiation heat from, e.g. an engine room of the vehicle. Accordingly, due to the increase of the temperature in the lamp chamber, the semiconductor light emitting element might not emit the light properly in the prior art. Therefore, there was a problem that the vehicular headlamp cannot be properly turned on.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a vehicular lamp for use in a vehicle, includes a semiconductor light emitting element for generating light used for a vehicular headlamp to emit the light forward from the vehicle, and a current controlling unit for allowing the semiconductor light emitting element to generate light used for a position lamp to indicate a position of the vehicle, in place of the light used for the vehicular headlamp, by reducing a current supplied to the semiconductor light emitting element based on an instruction of a driver of the vehicle. In addition, the current controlling unit may reduce the current, if the vehicle is stopped.

The vehicular lamp may include a plurality of the semiconductor light emitting elements coupled in parallel, wherein the current controlling unit may include a selecting unit for selecting all or a part of the plurality of semiconductor light emitting elements based on an instruction of the driver of the vehicle and a current supplying unit for allowing a part of the plurality of semiconductor light emitting elements to emit the light used for the position lamp by reducing currents supplied to the semiconductor light emitting elements, if the selecting unit selects the part of semiconductor light emitting elements by supplying currents to the selected semiconductor light emitting elements.

The vehicular lamp to which the present invention may be applied includes, but not limited to, a headlamp, turn-signal lamp, tail lamp, and the headlamp includes, but not limited to, a regular headlamp, fog lamp and cornering lamp, of automobiles, motorcycles, trains and the like.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
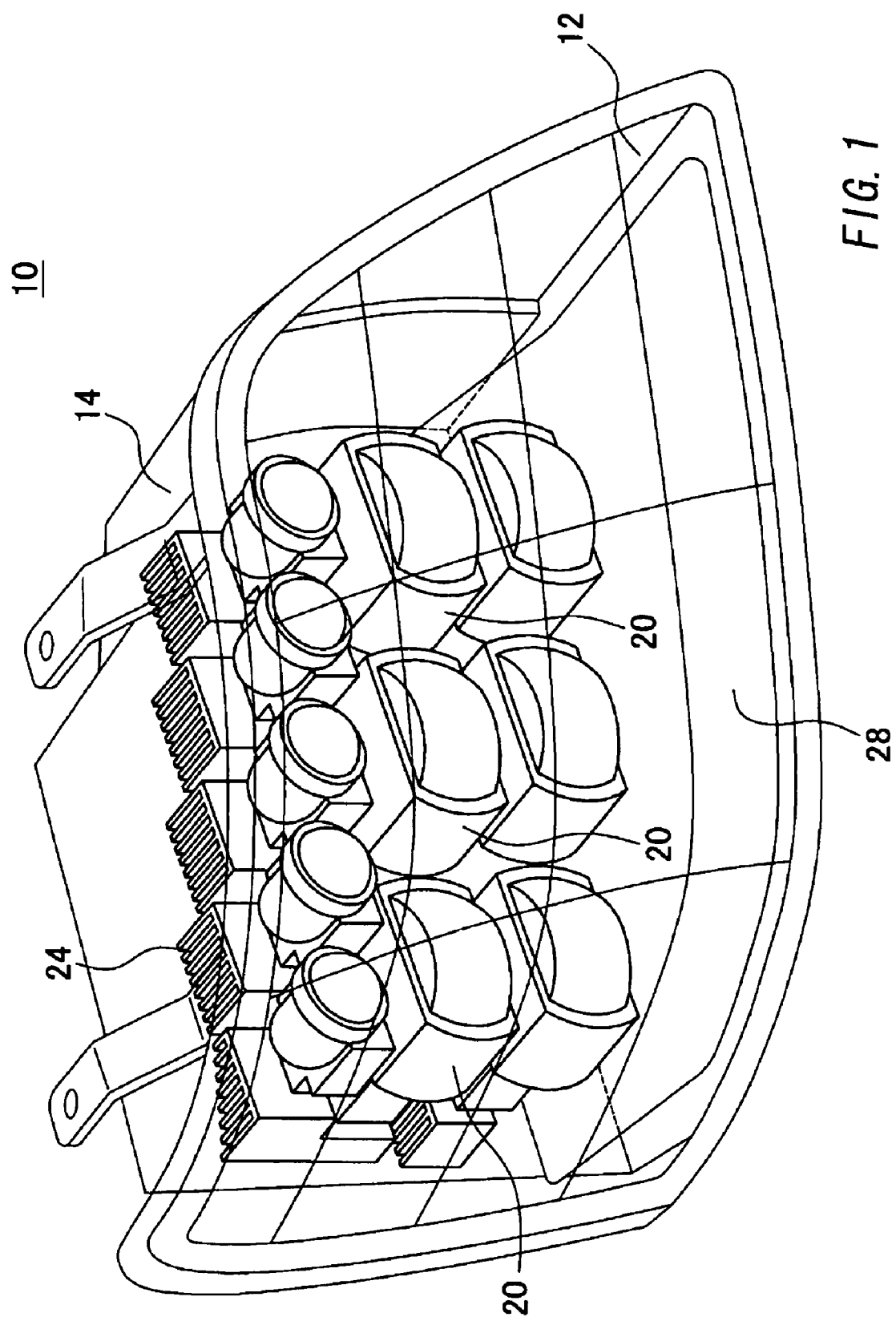
FIG. 1 is a perspective view of a vehicular lamp 10.
Figure 2:
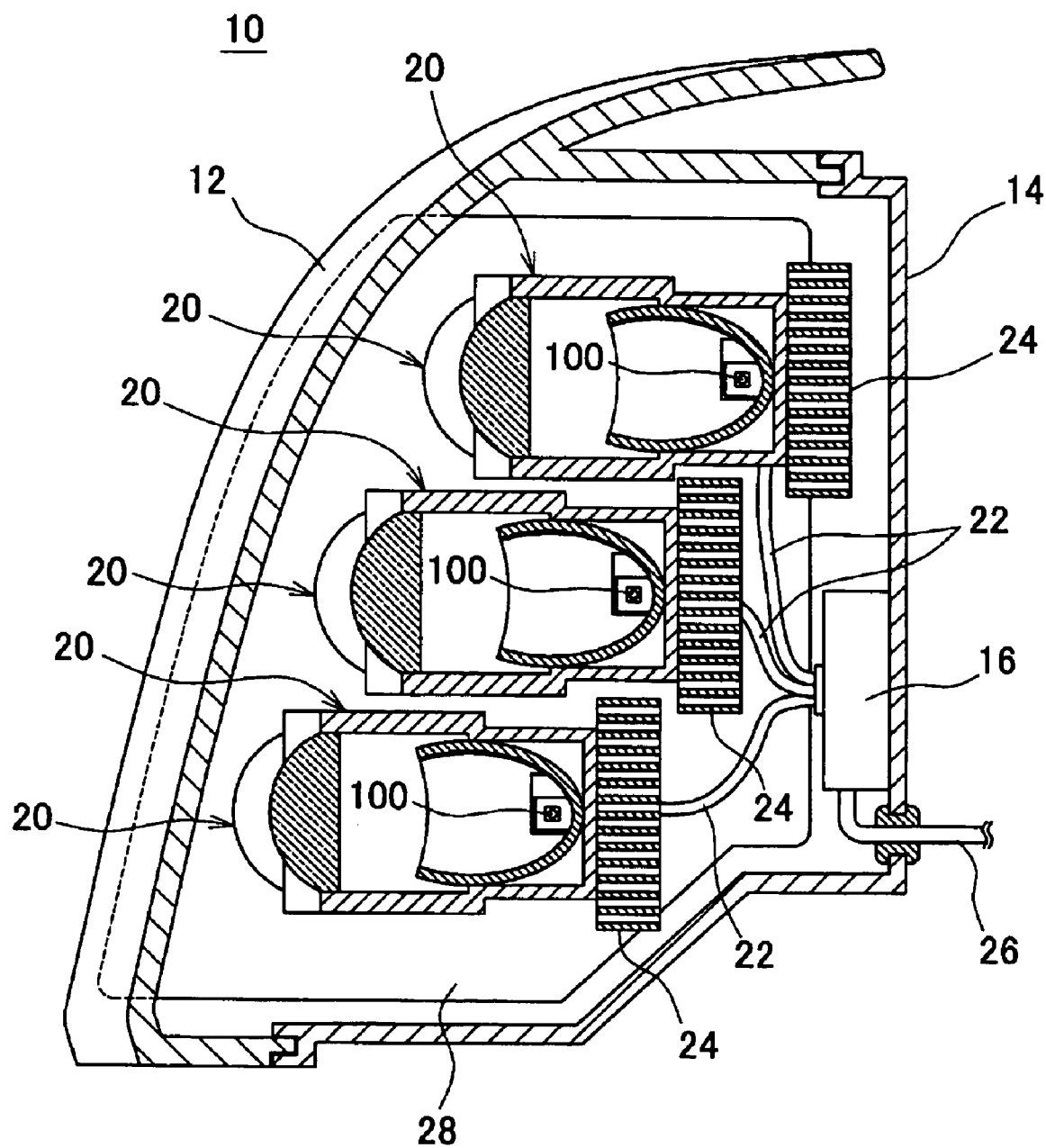
FIG. 2 is a horizontally cross-sectional view of a vehicular lamp 10.

FIGS. 1 and 2 show an example of the configuration of a vehicular lamp 10 according to an exemplary embodiment of the present invention. FIG. 1 is a perspective view of the vehicular lamp 10. FIG. 2 is a horizontally cross-sectional view of the vehicular lamp 10, which is a horizontal surface crossing the middle of the light source units 20. It is the object of the present embodiment to properly turn on the vehicular lamp 10 by controlling the increase of the temperature in a lamp chamber. The vehicular lamp 10 such as a vehicular headlamp emits the light forward from a vehicle, e.g. an automobile. The vehicular lamp 10 includes a plurality of light source units 20, a cover 12, a lamp body 14, a circuit unit 16, a plurality of heat radiation members 24, an extension reflector 28, and cables 22 and 26.

Each of the plurality of light source units 20 includes a light emitting diode 100, and emits the light of a predetermined light distribution pattern forward from the vehicle based on the light generated by the light emitting diode 100.

The light source units 20 are supported by the lamp body 14 to be tilted by an aiming function not shown to adjust the direction of the light axis of the light source units 20.

Furthermore, the plurality of light source units 20 may have the same or similar light distribution characteristics, or may have different light distribution characteristics respectively. And, in another embodiment, one of the light source units 20 may have the plurality of light emitting diodes 100. The light source units 20 may have semiconductor lasers as an alternative to the light emitting diodes 100.

In addition, the light emitting diode 100 is an example of a semiconductor light emitting element for emitting the light used for the vehicular lamp 10. In the present embodiment, the plurality of light emitting diodes 100 provided corresponding to the plurality of light source units 20 is coupled in series. In another embodiment, the plurality of light emitting diodes 100 may be coupled in parallel.

The cover 12 and the lamp body 14 form a lamp chamber of the vehicular lamp 10 to contain the plurality of light source units 20 therein. The cover 12 and the lamp body 14 may tightly seal and have the light source units 20 waterproofed. The cover 12 in the translucent shape is formed of a material through which the light generated by the light emitting diodes 100 can pass, and disposed in front of the vehicle so that it can cover the front of the plurality of light source units 20. The lamp body 14 facing the cover 12 with the plurality of light source units 20 being held therebetween is disposed to cover the plurality of light source units 20 from the back thereof. The lamp body 14 may be integrally formed with the body of the vehicle.

The circuit unit 16 is a module in which a lighting circuit for turning on the light emitting diodes 100 is provided. The circuit unit 16 is coupled electrically to the light source units 20 via the cables 22. In addition, the circuit unit 16 is coupled electrically to an external part of the vehicular lamp 10 via the cables 26.

The plurality of heat radiation members 24 formed of a material such as metal having higher heat transfer coefficient than air are heatsinks disposed being in contact with at least a part of the light source units 20. The heat radiation members 24 are movable accompanying the light source units 20 within a range where the light source units 20 are moved against a point for an aiming adjustment, and disposed having an enough space to the lamp body to perform the aiming adjustment of the light source units 20. In addition, the plurality of heat radiation members 24 may be integrally formed of one metal member. In this case, the entire heat radiation members 24 can perform radiation efficiently.

The extension reflector 28 is a reflecting mirror formed of a thin metal plate extending from the lower part of the plurality of light source units 20 over towards the cover 12. The extension reflector 28 is formed to cover at least a part of an internal face of the lamp body 14, and thereby the shape of the internal face of the lamp body 14 and the appearance of the vehicular lamp 10 is improved.

In addition, at least a part of the extension reflector 28 is in contact with the light source units 20 and/or the heat radiation members 24. In this case, the extension reflector 28 has a function of a heat transfer member for transferring the heat generated by the light emitting diodes 100 towards the cover 12. A part of the extension reflector 28 is fixed to the cover 12 or the lamp body 14. The extension reflector 28 may be formed in a frame form to cover the upper, lower and side parts of the plurality of light source units 20.

Here, if the temperature in the lamp chamber is increased by the radiation heat from, e.g. an engine room, when the light emitting diodes 100 generate the light, the temperature of the light source unit 20 is increased accompanying the heat generated by the light emitting diodes 100, and thereby the temperature in the lamp chamber becomes further increased. In this embodiment, however, when the vehicle is traveling, the heat of the cover 12 disposed in front of the vehicle is radiated by the wind theretoward.

Accordingly, accompanying the traveling of the vehicle, the cover 12 radiates the heat generated by the light emitting diodes 100 via the extension reflector 28 and/or the heat radiation members 24. According to the present embodiment, the light emitting diodes 100 can be properly turned on by controlling the increase of the temperature in the lamp chamber. In addition, due to this, the vehicular lamp 10 can be properly turned on.

Furthermore, in another embodiment, the cover 12 may radiate the heat generated by the light emitting diodes 100 receiving the heat from the heat radiation members 24 via the air in the lamp chamber. Also in this case, when the vehicle is traveling, it is possible to control the temperature in the lamp chamber.

Figure 3:
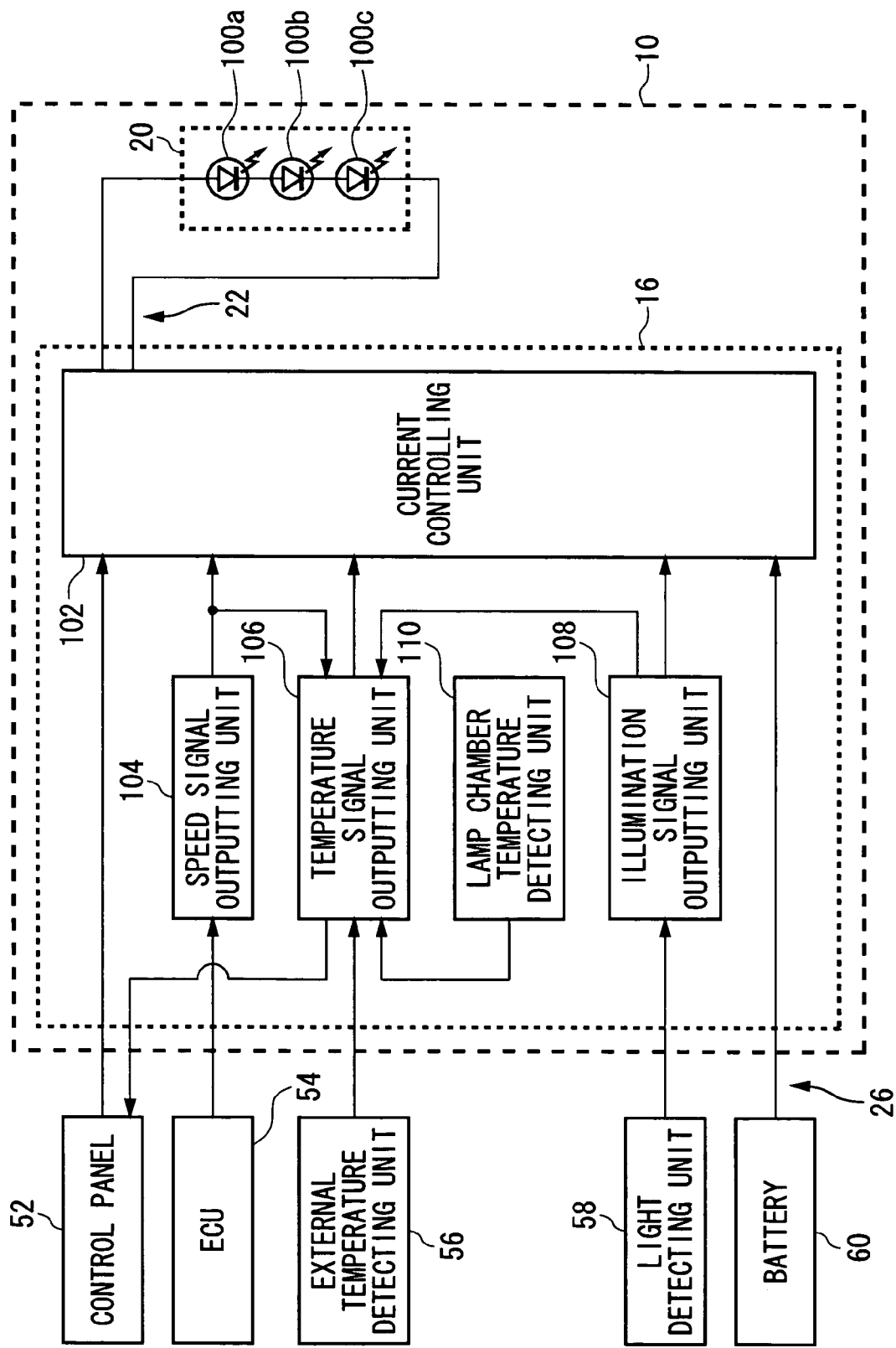
FIG. 3 shows an example of the circuit configuration of a vehicular lamp 10.

FIG. 3 shows an example of the circuit configuration of the vehicular lamp 10. In the present embodiment, the vehicular lamp 10 includes a plurality of light emitting diodes 100a to 100c coupled in series. The plurality of light emitting diodes 100a to 100c emit the light corresponding to the power received from the circuit 16. Each of the plurality of light emitting diodes 100a to 100c is provided in different light source units 20 respectively. In addition, the plurality of light emitting diodes 100a to 100c may be provided in one light source unit 20. The vehicular lamp 10 may further include other light emitting diodes 100 coupled in series or parallel.

And, in the present embodiment, the vehicular lamp 10 is coupled electrically to a control panel 52, an engine controlling unit 54, an external temperature detecting unit 56, a light detecting unit 58, and a battery 60, which are provided outside the vehicular lamp 10, via the cables 26.

Here, the control panel 52 disposed at a driver's seat receives instructions of, e.g. a driver of the vehicle via a switch. In the present embodiment, the control panel 52 receives the instruction indicating which to turn on the vehicular lamp 10 as a vehicular headlamp or position lamp. The control panel 52 may receive the instruction of the driver through switches that enable the driver to distinguish turning off the vehicular lamp 10, turning on it as the vehicular headlamp and turning on it as the position lamp from each other.

The engine controlling unit 54 is an electronic circuit for controlling an engine of the vehicle. In the present embodiment, the engine controlling unit 54 outputs a vehicle speed pulse signal whose frequency becomes higher corresponding to the speed of the vehicle.

The external temperature detecting unit 56, which is a thermometer provided, e.g. outside the vehicle, detects the temperature outside the vehicle. The light detecting unit 58, which is a photodetector such as a photodiode, outputs signals corresponding to the brightness around the vehicle. The battery 60 is a power supply mounted on the vehicle to supply the power to the vehicular lamp 10.

Hereinafter, the circuit unit 16 will be described in more detail. In the present embodiment, the circuit unit 16 includes a speed signal outputting unit 104, a temperature signal outputting unit 106, an illumination signal outputting unit 108, a lamp chamber temperature detecting unit 110 and a current controlling unit 102. In another embodiment, all or a part of the speed signal outputting unit 104, the temperature signal outputting unit 106, the illumination signal outputting unit 108, the lamp chamber temperature detecting unit 110 and the current controlling unit 102 may be provided outside the lamp chamber of the vehicular lamp 10.

The speed signal outputting unit 104 outputs a speed signal based on the speed of the vehicle. In the present embodiment, the speed signal outputting unit 104 supplies the speed signal indicating the speed of the vehicle to the current controlling unit 102 and the temperature signal outputting unit 106 based on the vehicle speed pulse signal received from the engine controlling unit 54.

In addition, when the vehicle is stopped, the speed signal outputting unit 104 may supply the speed signal indicating this to the current controlling unit 102 and the temperature signal outputting unit 106. The speed signal outputting unit 104 considers when a condition in which a speedometer indicates 0 continues for a predetermined period or a condition in which a parking brake of the vehicle is engaged as the vehicle being stopped. And, the speed signal outputting unit 104 may consider, e.g. when the speed is 0 to 5 km/h or when the speed is 0 to 5 km/h with the foot brake being operated as the vehicle being stopped. In this case, even if there is an error in the indication of the speedometer, it can be properly detected whether the vehicle is stopped or not.

The temperature signal outputting unit 106 outputs a temperature signal based on the temperature of the vehicular lamp 10. In the present embodiment, the temperature signal outputting unit 106 receives a signal indicating the temperature of the vehicular lamp 10 from the lamp chamber temperature detecting unit 110. And, the temperature signal outputting unit 106 compares the temperature of the vehicular lamp 10 with a predetermined threshold temperature, and outputs the temperature signal indicating the result of the comparison.

In this case, the temperature signal outputting unit 106 may set the threshold temperature based on, e.g. at least one of the temperature outside the vehicle, the speed of the vehicle and the brightness around the vehicle. The temperature signal outputting unit 106 may receive the signals indicating those respectively from the external temperature detecting unit 56, the speed signal outputting unit 104 and the illumination signal outputting unit 108 respectively.

The illumination signal outputting unit 108 receives the signal corresponding to the brightness around the vehicle from the light detecting unit 58, and supplies the illumination signal indicating the brightness around the vehicle to the current controlling unit 102 and the temperature signal outputting unit 106 based on the signal. In another embodiment, the current controlling unit 102 and the temperature signal outputting unit 106 may receive the illumination signal directly from the light detecting unit 58.

The lamp chamber temperature detecting unit 110 detects the temperature of the vehicular lamp 10. In the present embodiment, the lamp chamber temperature detecting unit 110 detects the temperature in the lamp chamber of the vehicular lamp 10, and outputs the signal indicating the temperature. The lamp chamber temperature detecting unit 110 may detect the temperature in the lamp chamber using, e.g. a thermistor provided in the lamp chamber.

Furthermore, the lamp chamber temperature detecting unit 110 preferably detects the temperature near the light emitting diodes 100a to 100c as the temperature of the vehicular lamp 10. In this case, the increase of the temperature of the light emitting diodes 100a to 100 c can be properly observed. In addition, the lamp chamber temperature detecting unit 110 may detect the temperature of the vehicular lamp 10 based on a forward voltage of the light emitting diodes 100a to 100c. In this case, the temperature of the light emitting diodes 100a to 100c can be detected directly and highly accurately.

The current controlling unit 102 causes the light emitting diodes 100a to 100c to generate the light used for the vehicular headlamp by supplying a predetermined supply current to the light emitting diodes 100a to 100c. And, the current controlling unit 102 receives the instruction of the driver of the vehicle from the control panel 52, and decreases the supply current based on this. Accordingly, the current controlling unit 102 causes the light emitting diodes 100a to 100c to generate the light used for the position lamp taking the place of the light used for the vehicular headlamp. According to this embodiment, it is possible to cause the light emitting diodes 100a to 100c in common to generate each kind of light used for the vehicular headlamp and the position lamp. Due to this, the cost of the vehicular lamp 10 can be reduced.

Furthermore, the position lamp is an example of the vehicular lamp to generate the light forward from the vehicle in order to indicate the position of the vehicle. The position lamp may generate the weaker light than the light of the vehicular headlamp, and it indicates the existence and the width of the vehicle to another vehicle facing the vehicle by being turned on in the daytime or in the evening.

Here, when the vehicular lamp 10 is turned on as the vehicular headlamp, the current controlling unit 102 in the present embodiment changes the supply current further based on the speed of the vehicle, the temperature of the vehicular lamp 10 and the brightness around the vehicle. In this case, the current controlling unit 102 may determine the speed of the vehicle, the temperature of the vehicular lamp 10 and the brightness around the vehicle based on the speed signal, the temperature signal and the illumination signal received from the speed signal outputting unit 104, the temperature signal outputting unit 106 and the illumination signal outputting unit 108 respectively.

For example, the current controlling unit 102 decreases the supply current if the speed of the vehicle is lower than a predetermined level. The current controlling unit 102 may decrease the supply current if the vehicle is stopped.

The current controlling unit 102 decreases the supply current if the temperature of the vehicular lamp 10 is higher than a predetermined threshold temperature. Further, the current controlling unit 102 decreases the supply current if the brightness around the vehicle is higher than a predetermined level. In addition, the current controlling unit 102 may change the supply current further based on the temperature outside the vehicle.

In the present embodiment, the current controlling unit 102 lessens the light of the vehicular lamp 10 being turned on as the vehicular headlamp by decreasing the supply current. Accordingly, the current controlling unit 102 prevents the temperature of the vehicular lamp 10 from overly increasing.

Here, if the light emitting diodes 100a to 100c of the vehicular lamp 10 are replaced by, e.g. a light bulb source using a filament for emitting the light corresponding to the supply current, the light bulb source might be deteriorated too early due to the change in the supply current. In addition, since the bulb source generates the light corresponding to the heat generation of the filament, the light bulb source might not properly emit the light due to the insufficient heat generation when the supply current is decreased.

Since the light emitting diodes 100a to 100c, however, generate the light by electroluminescence, they properly emit the light corresponding to each supply current without the deterioration due to the change in the supply current. And, according to this embodiment, the supply current can be properly changed. In addition, owing to this, the temperature of the vehicular lamp 10 is properly controlled, and thereby the vehicular lamp 10 can be properly turned on.

Figure 4:
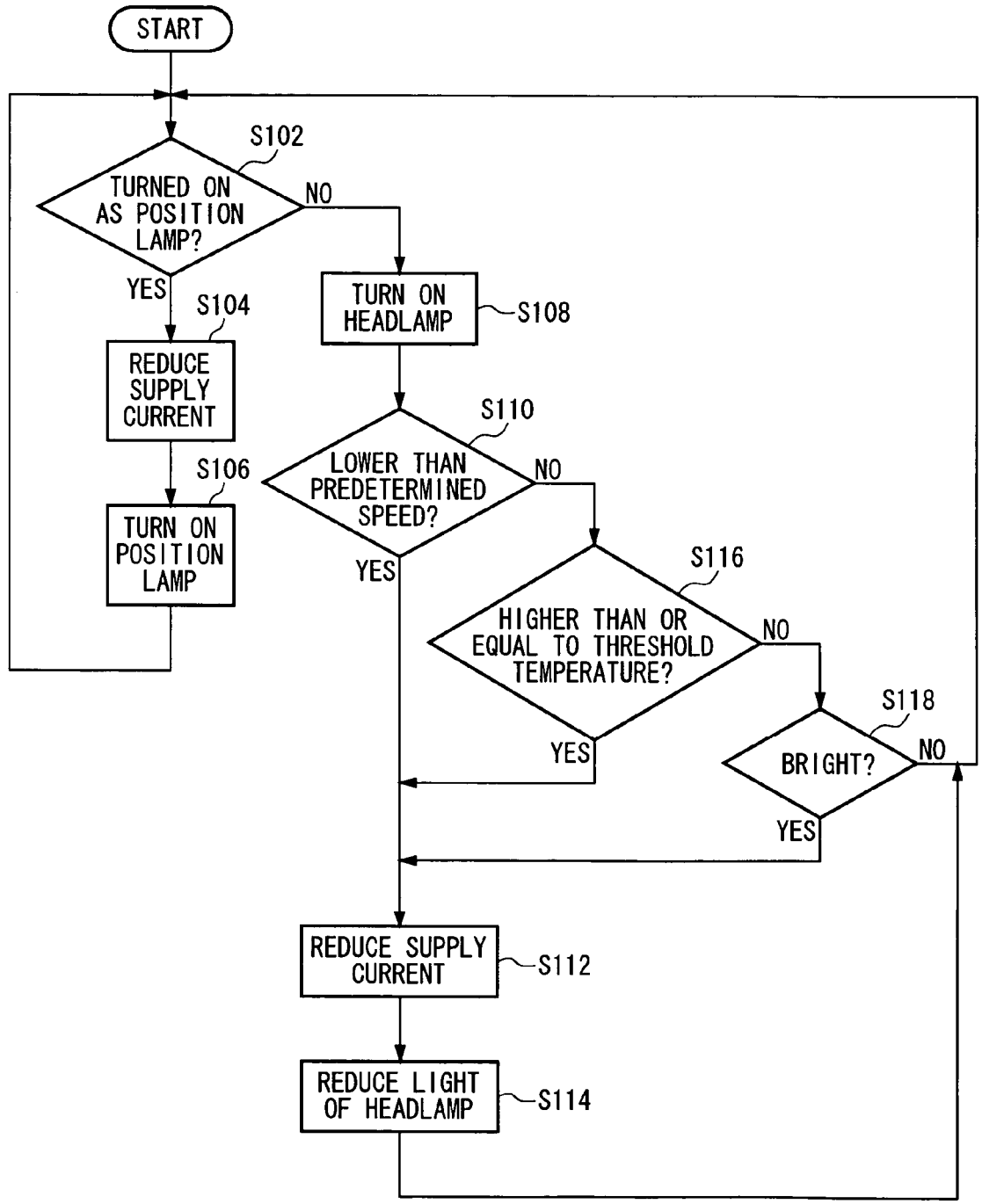
FIG. 4 is a flowchart showing an example of the operation of a current controlling unit 102.

FIG. 4 is a flowchart showing an example of the operation of the current controlling unit 102. The current controlling unit 102 first determines which to turn on the vehicular lamp 10 as the position lamp and the vehicular headlamp (S102).

Then, if the vehicular lamp 10 is turned on as the position lamp, the current controlling unit 102 decreases the supply current supplied to the light emitting diodes 100a to 100c (S104). Consequently, the current controlling unit 102 turns on the vehicular lamp 10 as the position lamp (S106).

In addition, if the vehicular lamp 10 is not turned on as the position lamp (S102), the current controlling unit 102 turns on the vehicular lamp 10 as the vehicular headlamp by supplying a predetermined supply current to the light emitting diodes 100a to 100c (S108).

Here, if the speed of the vehicle is lower than a predetermined level (S110), the current controlling unit 102 lessens the light of the vehicular lamp 10 being turned on as the vehicular headlamp by decreasing the supply current (S112, S114). In this case, the current controlling unit 102 may turn on the vehicular lamp 10 as the position lamp by decreasing the supply current.

Here, if the speed of the vehicle is low, the quantity of heat radiated from the cover 12 (c.f. FIG. 1) out of the vehicular lamp 10 is small because the wind received by the cover 12 is weak. Accordingly, in order to perform the sufficient radiation, the heat radiation members 24a to 24c (c.f. FIG. 1) are to be large, and thereby the weight of the vehicular lamp 10 is increased and the cost is also increased. Moreover, it might be undesirable in view of the design of the vehicular lamp 10.

According to the present embodiment, however, if the speed of the vehicle is low, the heat generation from the light emitting diodes 100a to 100c can be properly reduced by decreasing the supply current. Therefore, according to the present embodiment, the increase of the temperature in the lamp chamber of the vehicular lamp 10 is controlled, and thereby the light emitting diodes 100a to 100c can be properly turned on without making the heat radiation members 24a to 24c large. In addition, owing to this, the vehicular lamp 10 can be properly turned on.

Meanwhile, if the speed of the vehicle is higher than a predetermined level (S110) and the temperature of the vehicular lamp 10 is higher than or equal to a predetermined threshold temperature (S116), the current controlling unit 102 decreases the supply current (S112), and lessens the light of the vehicular lamp 10 (S114).

Accordingly, the increase of the temperature of the vehicular lamp 10 can be properly controlled. The current controlling unit 102 may control the supply current mainly based on the speed of the vehicle and control the supply current in a fail-safe manner by the temperature of the vehicular lamp 10. According to the present embodiment, the vehicular lamp 10 can be properly turned on. Furthermore, the current controlling unit 102 preferably controls the temperature of the vehicular lamp 10 so that the temperature at the PN junctions of the light emitting diodes 100a to 100c does not exceed about 150 degrees.

In addition, if the speed of the vehicle is higher than the predetermined level (S110), the temperature of the vehicular lamp 10 is lower than the threshold temperature (S116), and the brightness around the vehicle is higher than the predetermined level (S118), the current controlling unit 102 decreases the supply current (S112) and lessens the light of the vehicular lamp 10 (S114).

Here, if the brightness around the vehicle is high, the temperature outside the vehicle is also likely to be high, and thus the temperature of the vehicular lamp 10 might be liable to be increased. For example, when the vehicle is traveling with the vehicular headlamp being turned on in the midsummer daytime, the temperature in the lamp chamber of the vehicular lamp 10 might exceed 100 degrees. In this case, the temperature near the light emitting diodes 100a to 100c generating the light might exceed 150 degrees. According to the present embodiment, however, the increase of the temperature of the vehicular lamp 10 is further properly controlled, and thereby the vehicular lamp 10 can be properly turned on. And in this case, the daytime lighting can be performed properly and easily by, e.g. controlling the supply current in the case that the vehicular lamp 10 is turned on in the daytime.

Furthermore, the current controlling unit 102 may change the supply current based on any combination of the instructions of the driver of the vehicle, the speed of the vehicle, the temperature of the vehicular lamp 10, and the brightness around the vehicle. For example, if the speed of the vehicle is lower than the predetermined level and the temperature of the vehicular lamp 10 is higher than the threshold temperature the current controlling unit 102 may reduce the supply current. In addition, if the speed of the vehicle is lower than the predetermined level and the brightness around the vehicle is higher than the predetermined level, the current controlling unit 102 may reduce the supply current. If the temperature of the vehicular lamp 10 is lower than the threshold temperature and the brightness around the vehicle is higher than the predetermined level, the current controlling unit 102 may reduce the supply current.

Moreover, in the S110, the current controlling unit 102 may determine whether to stop the vehicle or not based on the speed signal received from the speed signal outputting unit 104 (c.f. FIG. 3). In this case, while the vehicle is traveling, the vehicular lamp 10 emits the light forward with the sufficient quantity of light, and thereby the high security can be guaranteed.

In addition, in that case, if the preparation for starting the vehicle's traveling is performed such as the parking brake is released, the current controlling unit 102 preferably increases the supply current before starting the vehicle's traveling. Accordingly, the vehicular lamp 10 can properly emit the light forward from the vehicle before starting the vehicle's traveling.

Figure 5:
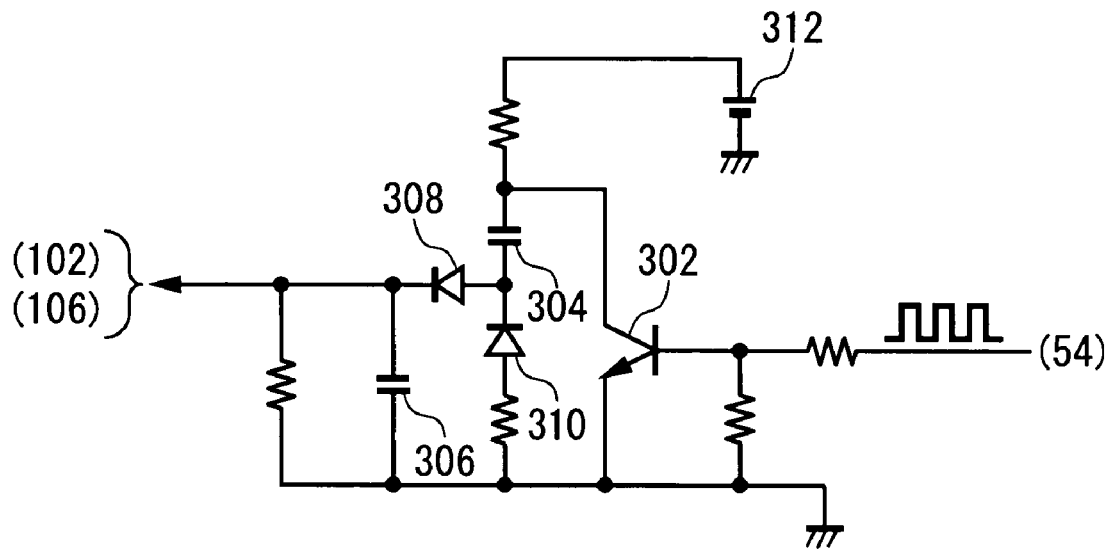
FIG. 5 shows an example of the circuit configuration of a speed signal outputting unit 104.

FIG. 5 shows an example of the circuit configuration of the speed signal outputting unit 104. In the present embodiment, the speed signal outputting unit 104 includes a constant voltage power supply 312, an NPN transistor 302, a plurality of capacitors 304 and 306, a plurality of diodes 308 and 310 and a plurality of resistors.

The constant voltage power supply 312, e.g. a battery, outputs a predetermined reference voltage. The constant voltage power supply 312 may output the reference voltage based on the output voltage of the battery (c.f. FIG. 3). The constant voltage power supply 312 may output the output voltage of battery 60 itself as the reference voltage.

The NPN transistor 302 is on or off corresponding to a cycle of the vehicle speed pulse signal received from the engine controlling unit 54 through the base terminal, and discharges the capacitor 304 during the period when it is on.

Here, one end of the capacitor 304 is coupled electrically to the constant voltage power supply 312 via a resistor. Therefore, while the NPN transistor 302 is off, the capacitor 304 is charged by the constant voltage power supply 312. Accordingly, the capacitor 304 is repeatedly charged and discharged corresponding to the cycle of the vehicle speed pulse signal.

And, the other end of the capacitor 304 is coupled electrically to the cathode of the diode 310 and the anode of the diode 308. The anode of the diode 310 is grounded via a resistor, and the cathode of the diode 308 is grounded holding the capacitor 306 therebetween.

Therefore, when the NPN transistor 302 is on, the negative electrons charged at the other end of the capacitor 304 are discharged, and thereby the diode 310 supplies the current to the other end of the capacitor 304. On the other hand, when the NPN transistor 302 is off, the negative electrons are charged at the other end of the capacitor 304, and thereby the diode 308 allows the current to flow from the capacitor 304 towards the capacitor 306. Accordingly, the diode 308 supplies the current intermittently towards the capacitor 306 corresponding to the cycle of the vehicle speed pulse signal.

And, the node coupled to both the capacitor 306 and the diode 308 is grounded via a resistor. In this case, the capacitor 306 filters the current flowing through the diode 308. Therefore, the capacitor 306 causes a voltage corresponding to the vehicle speed pulse signal between both ends thereof. The capacitor 306 causes a higher voltage between both ends thereof if the speed of the vehicle is higher.

In this embodiment, the speed signal outputting unit 104 supplies the voltage generated between both ends of the capacitor 306 to the current controlling unit 102 and the temperature signal outputting unit 106 as the speed signal. According to this embodiment, the speed of the vehicle can be properly detected.

In addition, in the present embodiment, the speed signal outputting unit 104 outputs the speed signal that is gradually changed corresponding to the speed of the vehicle. In this case, it is preferable that the current controlling unit 102 gradually and linearly decreases the supply current, if the speed of the vehicle becomes lower than the predetermined level. In this case, the quantity of light of the vehicular lamp 10 is suddenly changed, and thereby the driver can be prevented from being dazzled.

Furthermore, in another embodiment, the speed signal outputting unit 104 may perform digital signal processing on the vehicle speed pulse signal and thereby may output the speed signal in a digital form. In this case, the speed signal outputting unit 104 may include a general purpose computer for performing the digital signal processing. In addition, the speed signal outputting unit 104 may convert the vehicle speed pulse signal into an analog form using a transistor or capacitor to generate the speed signal.

Figure 6:
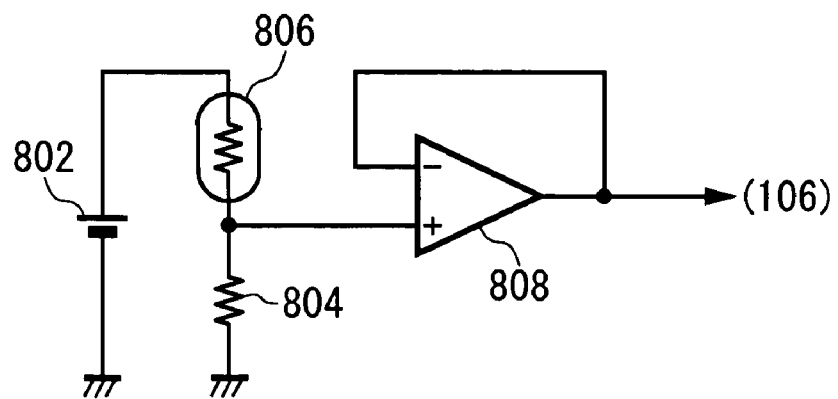
FIG. 6 shows an example of the circuit configuration of a lamp chamber temperature detecting unit 110.

FIG. 6 shows an example of the circuit configuration of the lamp chamber temperature detecting unit 110. In the present embodiment, the lamp chamber temperature detecting unit 110 includes a constant voltage power supply 802, a thermistor 806, a resistor 804 and an Op-Amp 808. The positive pole of the constant voltage power supply 802 is grounded via the thermistor 806 and the resistor 804 coupled in series. Each end of the thermistor 806 is coupled electrically to the positive pole of the constant voltage power supply 802 and the non-inverting input of the Op-Amp 808 respectively. Each end of resistor 804 is coupled electrically to the non-inverting input of the Op-Amp 808 and the ground respectively. The thermistor 806 is preferably disposed near the light emitting diodes 100 (c.f. FIG. 3). In addition, the Op-Amp 808, which is a voltage follower whose output is fed back to the inverting input, outputs the voltage received to the non-inverting input to the temperature signal outputting unit 106.

Here, in this embodiment, the thermistor 806 has negative characteristics to temperature, and its resistance decreases corresponding to the increase of temperature. Accordingly, the Op-Amp 808 receives the voltage increasing corresponding to the increase of the temperature of the thermistor 806 through the non-inverting input. Therefore, the lamp chamber temperature detecting unit 110 gives the voltage increasing corresponding to the increase of the temperature to the temperature signal outputting unit 106 as the signal indicating the temperature of the vehicular lamp 10.

Figure 7:
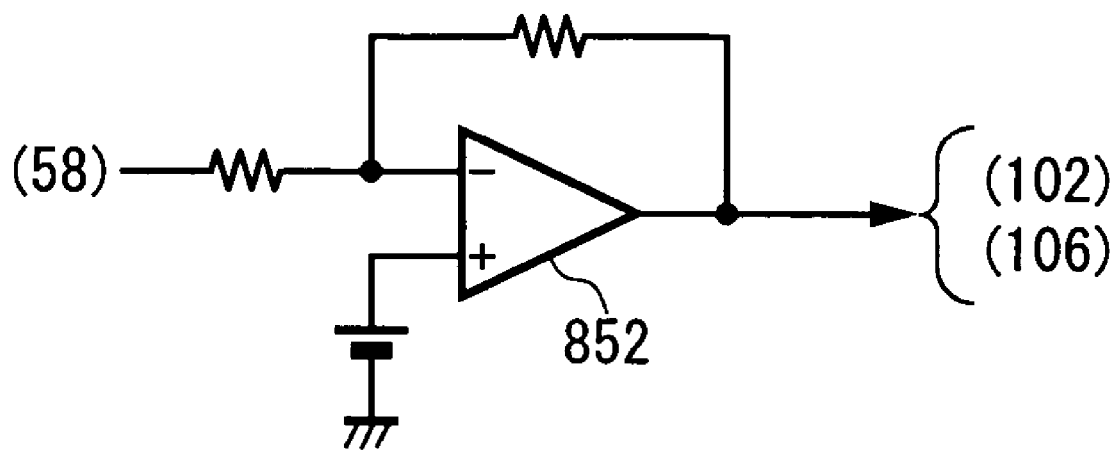
FIG. 7 shows an example of the circuit configuration of an illumination signal outputting unit 108.

FIG. 7 shows an example of the circuit configuration of the illumination signal outputting unit 108. The illumination signal outputting unit 108 includes an Op-Amp 852, a constant voltage power supply and a plurality of resistors. The Op-Amp 852 receives the output of the light detecting unit 58 via the resistor through the inverting input, and receives a predetermined reference voltage from the constant voltage power supply through the non-inverting input. In addition, the Op-Amp 852 gives the output fed back via a resistor to the current controlling unit 102 and the temperature signal outputting unit 106 as the illumination signal. Accordingly, the illumination signal outputting unit 108 outputs the voltage resulting from differentially inverting the output of the light detecting unit 58 as the illumination signal.

Here, the light detecting unit 58 is, e.g. a photodiode used for a system to automatically turn on the vehicular lamp 10 in a tunnel, and the brighter the surrounding of the vehicle is, the higher voltage the light detecting unit 58 outputs. Accordingly, the illumination signal outputting unit 108 outputs the illumination signal so that the brighter the surrounding of the vehicle is, the lower the voltage is.

Figure 8:
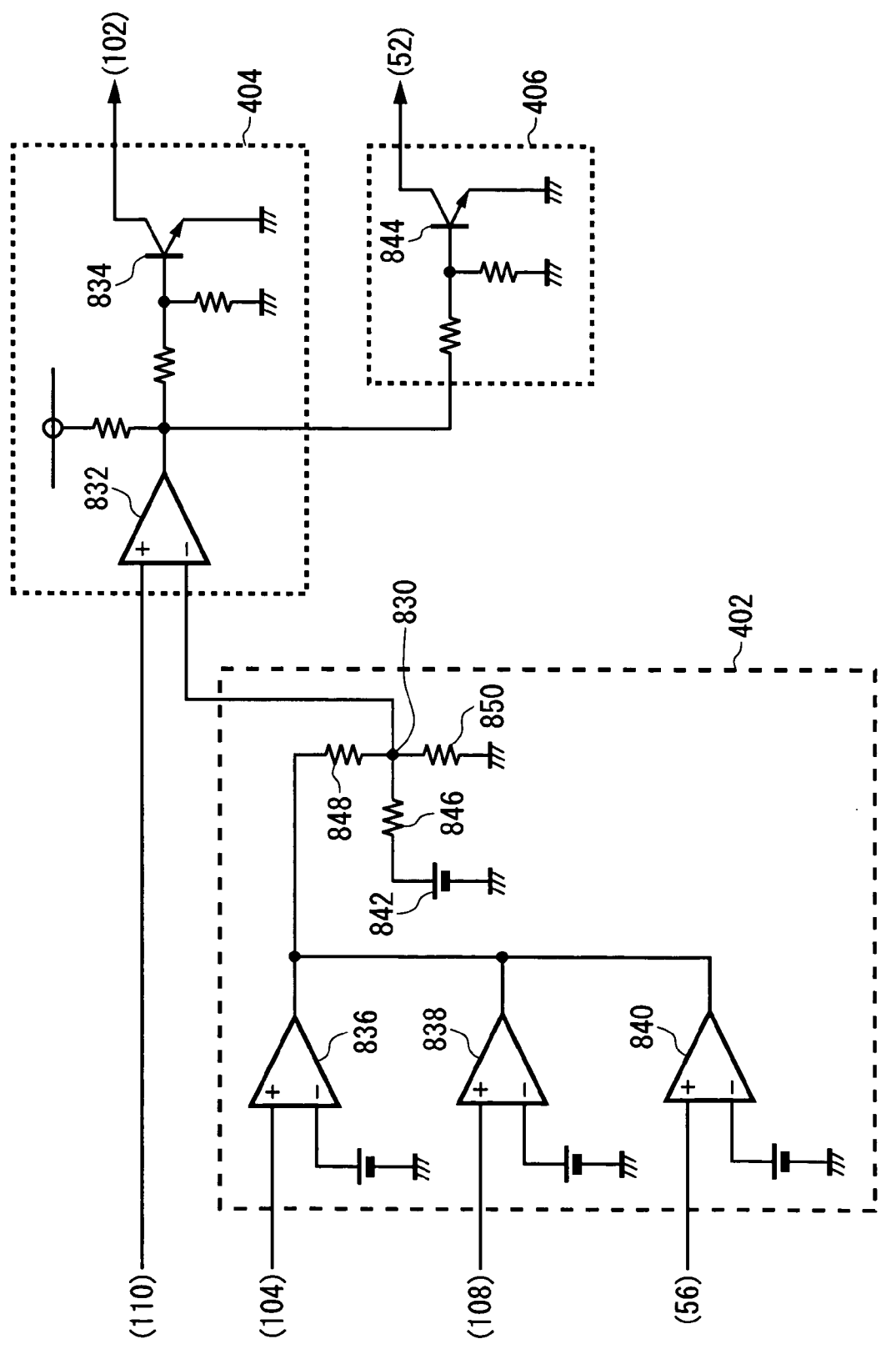
FIG. 8 shows an example of the circuit configuration of a temperature signal outputting unit 106.

FIG. 8 shows an example of the circuit configuration of the temperature signal outputting unit 106. In this embodiment, the temperature signal outputting unit 106 includes a threshold temperature setting unit 402, a temperature comparing unit 404, and a temperature increase signal outputting unit 406.

The threshold temperature setting unit 402 includes a plurality of comparators 836 to 840, a plurality of constant voltage power supplies, and a plurality of resistors. Each of the plurality of comparators 836 to 840, which is an open collector output, receives a predetermined reference voltage through its inverting input. Each of the plurality of comparators 836 to 840 may receive a different voltage respectively as the reference voltage.

The comparator 836 receives the speed signal whose voltage increases corresponding to the increase of the speed of the vehicle from the speed signal outputting unit 104 through its non-inverting input. Therefore, if the voltage of the speed signal is lower than the reference voltage received to its inverting input, the comparator 836 allows its output to sink current. Accordingly, if the speed of the vehicle is lower than a level corresponding to the reference voltage, the comparator 836 allows its output to sink current.

The comparator 838 receives the illumination signal from the illumination signal outputting unit 108 through its non-inverting input such that the brighter the surrounding of the vehicle is, the lower the voltage thereof is. Accordingly, if the voltage of the illumination signal is lower than the reference voltage received to its inverting input, the comparator 838 allows its output to sink current. Therefore, if the brightness around the vehicle is higher than a level corresponding to the reference voltage, the comparator 838 allows its output to sink current.

The comparator 840 receives the signal indicating the temperature outside the vehicle from the external temperature detecting unit 56 through its non-inverting input. In this embodiment, the external temperature detecting unit 56 outputs the signal whose voltage decreases corresponding to the temperature outside the vehicle. Therefore, if the voltage of the signal is lower than the reference voltage received to its inverting input, the comparator 840 allows its output to sink current. Accordingly, if the temperature outside the vehicle is higher than a level corresponding to the reference voltage, the comparator 838 allows its output to sink current.

Here, the output of each of the comparators 836, 838 and 840 is coupled electrically to a node 830 that is an output terminal of the threshold temperature setting unit 402. The node 830 is coupled electrically to the positive pole of the constant voltage power supply 842 via the resistor 846, and grounded via the resistor 850. The threshold temperature setting unit 402 gives the voltage of the node 830 to the inverting input of the comparator 832 as the signal indicating the threshold temperature. In this embodiment, the threshold temperature setting unit 402 outputs the signal indicating the threshold temperature such that the higher the threshold temperature is, the larger the signal is.

Here, if any of the comparators 836, 838 and 840 allows its output to sink current, the node 830 is further grounded via the resistor 848, and thereby the voltage of the node is decreased. The threshold temperature setting unit 402 sets a predetermined first threshold temperature corresponding to the decreasing voltage to give it to the comparator 832.

Meanwhile, if any of the comparators 836, 838 and 840 does not allow its output to sink current, the resistor 848 does not conduct any current, and the voltage of the node 830 is set as a fraction of the output of the constant voltage power supply 842 by the resistors 846 and 850. The threshold temperature setting unit 402 sets a second threshold temperature that is higher than the first threshold temperature corresponding to that voltage.

Accordingly, the threshold temperature setting unit 402 sets the threshold temperature based on the speed signal, the illumination signal, and the signal indicating the temperature outside the vehicle. For example, if the speed of the vehicle is lower than a predetermined level, if the brightness around the vehicle is higher than a predetermined level, or if the temperature outside the vehicle is higher than a predetermined level, the threshold temperature setting unit 402 sets the first threshold temperature. In addition, if the speed of the vehicle is higher than or equal to the predetermined level, if the brightness around the vehicle is lower than or equal to the predetermined level, or if the temperature outside the vehicle is lower than or equal to the predetermined level, the threshold temperature setting unit 402 sets the second threshold temperature.

The threshold temperature setting unit 402 may set the first and second threshold temperatures to be, e.g. 120 and 150 degrees respectively. The threshold temperature setting unit 402 may set the threshold temperature based on at least one of the speed of the vehicle, the brightness of the vehicle and the temperature outside the vehicle.

The temperature comparing unit 404 includes a comparator 832, an NPN transistor 834 and a plurality of resistors. The comparator 832 receives the signal indicating the temperature of the vehicular lamp (c.f. FIG. 3) from the lamp chamber temperature detecting unit 110 through its non-inverting input, and receives the signal indicating the threshold voltage from the threshold temperature setting unit 402 through its inverting input.

In addition, the comparator 832 gives the open collector output to the base terminal of the NPN transistor 834 via the resistor. The output is clamped to a predetermined voltage via the resistor. The base terminal of the NPN transistor 834 is grounded via the resistor, and the collector terminal is coupled electrically to the current controlling unit 102.

Here, the lamp chamber temperature detecting unit 110 outputs the voltage increasing corresponding to the increase of the temperature as the signal indicating the temperature of the vehicle 10. Accordingly, if the temperature of the vehicular lamp 10 is higher than the threshold temperature, the comparator 832 does not allow its output to sink current, and thereby the NPN transistor 834 becomes on to sink the collector current. Meanwhile, if the temperature of the vehicular lamp 10 is lower than the threshold temperature, the comparator 832 allows its output to sink current, and thereby the NPN transistor 834 becomes off. And, the NPN transistor 834 supplies the voltage of the collector terminal to the current controlling unit 102 as the temperature signal. Accordingly, the temperature comparing unit 404 supplies the temperature signal indicating the result of comparing the temperature of the vehicular lamp 10 with the threshold temperature to the current controlling unit 102. If the temperature of the vehicular lamp 10 is higher than the threshold temperature, the temperature comparing unit 404 gives an L signal to the current controlling unit 102. Furthermore, in the case of not using the threshold temperature, the temperature comparing unit 404 may give the signal received from the lamp chamber temperature detecting unit 110 directly to the current controlling unit 102.

The temperature increase signal outputting unit 406 includes an NPN transistor 844 and a plurality of resistors. The collector terminal of the NPN transistor 844 is coupled electrically to the control panel 52, and its base terminal receives the output of the comparator 832 via a resistor. In addition, the base terminal is grounded via a resistor.

Accordingly, the NPN transistor 844 gives the same signal as the temperature signal, which is given by the NPN transistor 834 to the current controlling unit 102, to the control panel 52 by the open collector output. Therefore, if the temperature of the vehicular lamp 10 becomes higher than the threshold temperature, the temperature increase signal outputting unit 406 outputs the signal indicating the increase of the temperature of the vehicular lamp 10 to an external part outside the temperature signal outputting unit 106. The control panel 52 may alert the driver of the vehicle to the increase of the temperature by an alert sound, turning on an indicator, displaying a message or the like. Accordingly, the driver of the vehicle can detect the increase of the temperature of the vehicular lamp 10.

According to the present embodiment, the increase of the temperature of the vehicular lamp 10 can be properly detected. Therefore, the current controlling unit 102 can properly change the supply current corresponding to the temperature. The current controlling unit 102 reduces the supply current to the light emitting diodes 100a to 100c (c.f. FIG. 3), if the temperature of the vehicular lamp 10 is higher than the threshold temperature.

In addition, if the speed of the vehicle is low, if the surrounding of the vehicle is bright, or if the temperature around the vehicle is high, the temperature of the vehicle 10 might be liable to increase. Accordingly, in this case, the threshold temperature setting unit 402 sets the threshold temperature to be low. In this case, the current controlling unit 102 reduces the supply current based on the lower threshold temperature. Therefore, the increase of the temperature of the vehicular lamp 10 can be more properly controlled.

Furthermore, not caused by the speed of the vehicle in the case that the threshold temperature is constant, when the temperature of the vehicular lamp 10 is close to the threshold temperature while, e.g. the vehicle is stopping, the temperature of the vehicular lamp 10 is increased temporarily and then exceeds the threshold temperature due to the radiation heat from, e.g. the engine room right after starting to drive. In this case, if the current controlling unit 102 reduces the supply current, the quantity of light of the vehicular lamp 10 might not be enough.

In this embodiment, however, even though the temperature of the vehicle 10 is about the first threshold temperature, the start of traveling causes the second threshold temperature to be set, and thereby the current controlling unit 102 does not reduce the supply current. Accordingly, the vehicular lamp 10 can emit the light of enough quantity forward.

Figure 9:
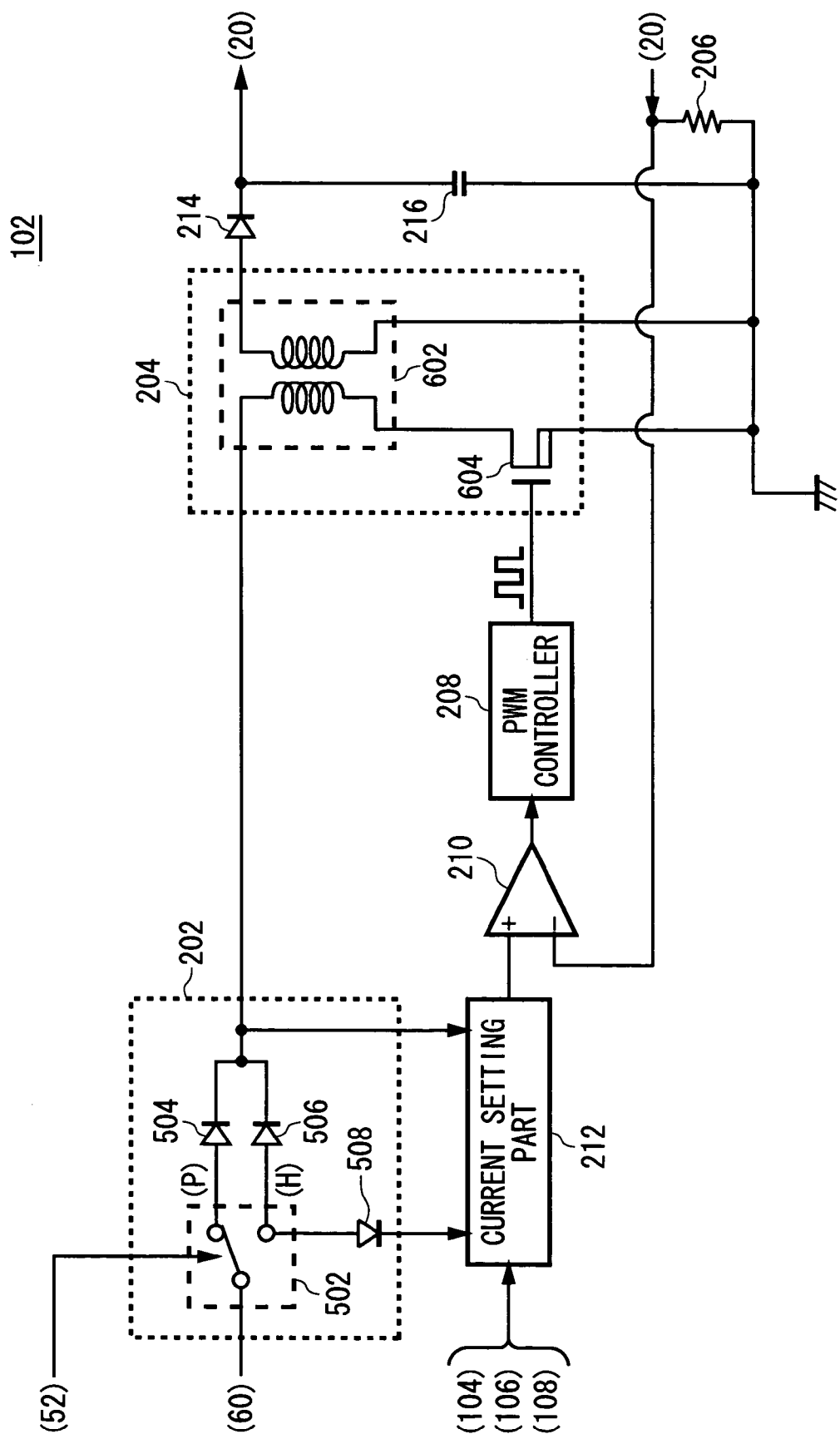
FIG. 9 shows an example of the configuration of a current controlling unit 102.

FIG. 9 shows an example of the configuration of the current controlling unit 102. The current controlling unit 102 in this embodiment includes a switching part 202, a current setting part 212, a resistor 206, an Op-Amp 210, a PWM controller 208, a switching regulator 204, a diode 214, and a capacitor 216.

The switching part 202 includes a changeover switch 502 and a plurality of diodes 504, 506 and 508. The changeover switch 502 receives an instruction indicating which to turn on the vehicular lamp 10 (c.f. FIG. 3) as the vehicular headlamp or the position lamp from the control panel 52, and determines which to output the power outputted by the battery 60 to a terminal (P) or terminal (H) in response to the instruction.

For example, if the vehicular lamp 10 is turned on as the vehicular headlamp, the changeover switch 502 couples the battery 60 and the terminal (H) electrically. Meanwhile, if the vehicular lamp 10 is turned on as the position lamp, the changeover switch 502 couples the battery 60 and the terminal (p) electrically.

Each of the anodes of the diodes 504 and 506 is coupled electrically to the terminal (P) and terminal (H) respectively. And, the cathodes of the diodes 504 and 506 are coupled electrically to each other. And, these cathodes are coupled electrically to the switching regulator 204 and the current setting part 212.

Accordingly, even if either the terminal (p) or terminal (H) is coupled electrically to the battery 60, the switching part 202 supplies the power outputted by the battery 60 to the current setting part 212 and the switching regulator 204 via the diodes 504 and 506.

In addition, the anode and the cathode of the diode 508 are coupled electrically to the terminal (H) and the current setting part 212 respectively. Accordingly, if the changeover switch 502 couples the battery 60 and the terminal (H) electrically, the switching part supplies the power outputted by the battery 60 to the current setting part 212.

Therefore, if the vehicular lamp 10 is turned on as the vehicular headlamp, the diode 508 outputs a signal of H level. Meanwhile, if the vehicular lamp 10 is turned on as the position lamp, the diode 508 outputs a signal of L level. Accordingly, the switching part 202 transfers the instruction indicating which to turn on the vehicular lamp 10 as the vehicular headlamp or the position lamp to the current setting part 212.

Furthermore, in another embodiment, the changeover switch 502 may be provided at the vehicle body outside the vehicular lamp 10, being separated from the switching part 202. In this case, the switching part 202 is coupled to the switching part 202 inside the vehicular lamp 10 via a pair of wirings provided corresponding to each of the terminals (P) and (H). The diodes 504 and 506 receive the output voltage of the battery 60 via the pair of wirings. And in this case, the driver of the vehicle may operate the changeover switch 502 directly not via the control panel 52. Also in this case, the switching part 202 transfers the instruction indicating which to turn on the vehicular lamp 10 as the vehicular headlamp or the position lamp to the current setting part 212.

The current setting part 212 sets the magnitude of the supply current based on the instruction received from the control panel 52 via the switching part 202. And in this embodiment, the current setting part 212 sets the magnitude of the supply current further based on the speed signal, the temperature signal and the illumination signal received from the speed signal outputting unit 104, the temperature signal outputting unit 106 and the illumination signal outputting unit 108 respectively, and gives the voltage corresponding to the determined magnitude of the supply current to the non-inverting input of the Op-Amp 210.

The resistor 206 is coupled in series to the plurality of light emitting diodes 100a to 100c (c.f. FIG. 3) downstream thereof, and the voltage corresponding to the magnitude of the supply current supplied thereto occurs between both ends of it. And, one end of the resistor 206 is grounded, and the other end thereof is coupled electrically to the inverting input of the Op-Amp 210. Accordingly, the resistor 206 gives the voltage corresponding to the magnitude of the supply current supplied to the plurality of light emitting diodes 100a to 100c to the inverting input thereof. Further, the plurality of light emitting diodes 100a to 100c is included in the plurality of light source units 20a to 20c.

The Op-Amp 210 compares the magnitude of the supply current set by the current setting part 212 with the magnitude of the supply current supplied to the plurality of light emitting diodes 100a to 100c based on the voltages received from the current setting part 212 and the resistor 206 through the non-inverting input and the inverting input respectively, and gives the comparison result to the PWM controller 208. The PWM controller 208 changes the output of the switching regulator 204 by modulating the pulse width corresponding to the output of the Op-Amp 210, and outputs the supply current whose magnitude has been set by the current setting part 212 to the switching regulator 204.

The switching regulator 204 includes a transformer 602 and a switch 604. The primary coil of the transformer 602 receives the power from the battery 60 via the switching part 202, and is grounded via the switch 604. And, the secondary coil of the transformer 602 is coupled electrically to the plurality of light emitting diodes 100a to 100c via the diode 214, and supplies the supply current filtered by the capacitor 216 to the plurality of light emitting diodes 100a to 100c.

The switch 604, which is an NMOS transistor coupled in series to the primary coil of the transformer 602, receives the pulse signal outputted by the PWM controller 208 through the gate terminal thereof. Accordingly, the switch 604 is repeatedly on and off corresponding to the pulse signal, and then regulates the current flowing through the primary coil of the transformer 602. In addition, due to this, the switch 604 changes the current flowing through the primary coil of the transformer 602 corresponding to the pulse signal.

In this case, the secondary coil of the transformer 602 gives the supply current whose magnitude is set by the current setting part 212 corresponding to the pulse width of the pulse signal to the plurality of light emitting diodes 100a to 100*c*. Accordingly, the switching regulator 204 supplies the supply current to the light emitting diodes 100*a* to 100*c* based on the instruction received from the control panel 52, the speed signal, the temperature signal and the illumination signal. According to this embodiment, the supply current given to the light emitting diodes 100*a* to 100*c* can be properly changed.

Here in this embodiment, the current controlling unit 102 has a function of a constant current output circuit for outputting a predetermined supply current by performing a feedback control based on the result of detecting the outputted supply current. Therefore, according to this embodiment, the supply current can be regulated highly accurately.

In addition, according to this embodiment, by using the switching regulator 204 the power consumption of the vehicular lamp 10 can be reduced. And accordingly, the vehicular lamp 10 can be miniaturized. Furthermore, even if the output voltage of the battery 60 is changed, the stable supply current can be given to the light emitting diodes 100*a* to 100*c*.

Figure 10:
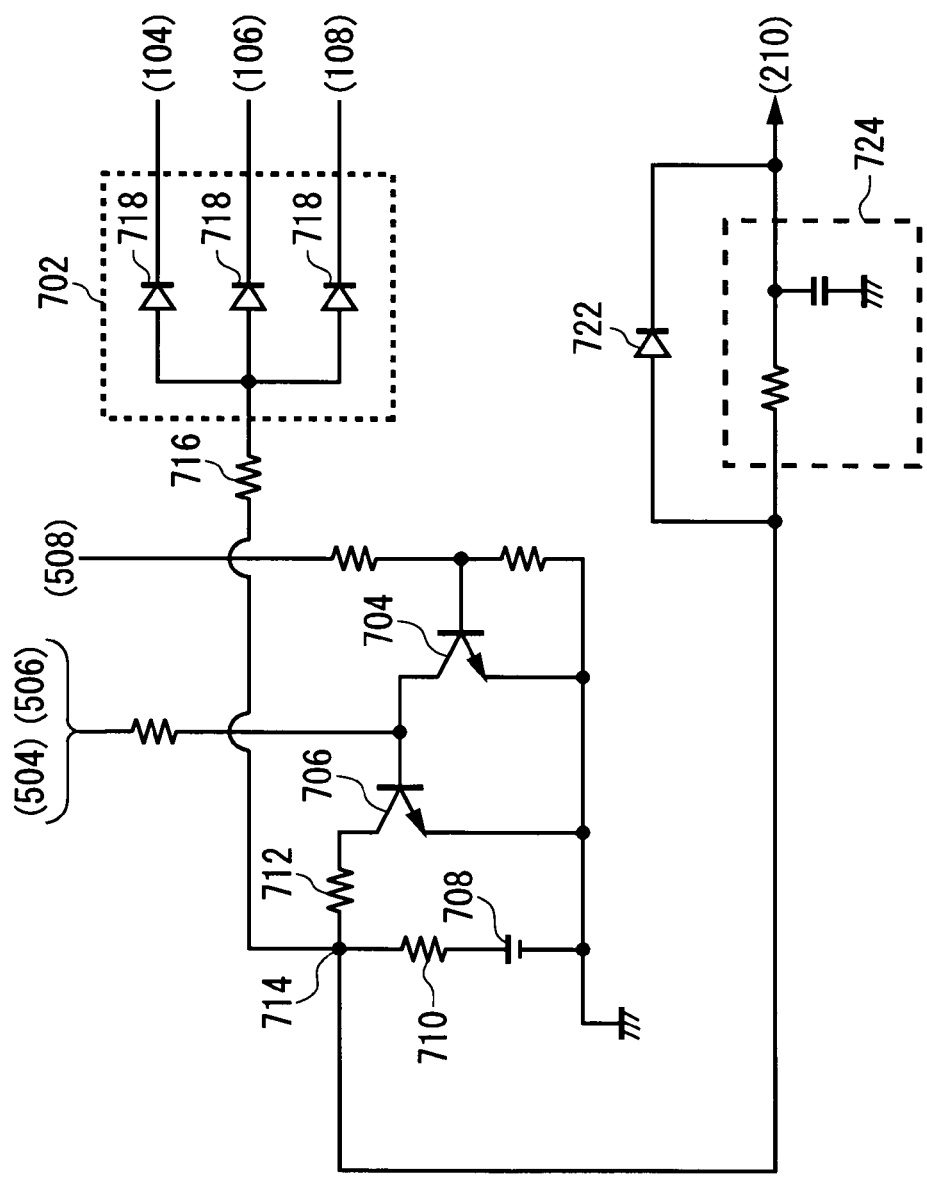
FIG. 10 shows an example of the circuit configuration of a current setting part 212.

FIG. 10 shows an example of the circuit configuration of the current setting part 212. In this embodiment, the current setting part 212 includes a constant voltage power supply 708, an NPN transistor 706, an NPN transistor 704, a current designation voltage outputting part 702, a low-pass filter 724, a diode 722, and a plurality of resistors.

In this embodiment, the current setting part 212 outputs the voltage of the node 714 to the Op-Amp 210 via the low-pass filter 724 or the diode 722. In addition, the voltage of the node 714 is regulated by the constant voltage power supply 708, the NPN transistor 706, and the current designation voltage outputting unit 702.

The constant voltage power supply 708, which is a battery, outputs a predetermined reference voltage. The positive pole of the constant voltage power supply 708 is coupled electrically to the node 714 via the resistor 710. Further, the constant voltage power supply 708 may output the reference voltage based on the output voltage of the battery 60 (c.f. FIG. 1).

The collector terminal of the NPN transistor 706 is coupled electrically to the node 714 via the resistor 712, and the base terminal receives the output voltage of the battery 60 via the diodes 504 and 506 and a resistor. And, the base terminal is coupled electrically to the collector of the NPN transistor 704. The NPN transistor 704 receives the voltage into which the output of the diode 508 is divided through the base terminal thereof, and thereby becomes on in the case that the output of the diode 508 is the H level, and then allows the base terminal of the NPN transistor 706 to sink current.

Here, as described in relation to FIG. 9, if the vehicular lamp 10 is turned on as the position lamp, the diode 508 outputs the signal of L level. In this case, since the NPN transistor 704 becomes off, the NPN transistor 706 becomes on, and the voltage of the node 714 is reduced. Accordingly, in this case, the current setting part 212 gives a predetermined voltage lower than the reference voltage outputted by the constant voltage power supply 708 to the Op-Amp 210. In addition, the switching regulator 204 (c.f. FIG. 9) reduces the supply current corresponding to the voltage, and turns on the vehicular lamp 10 as the position lamp.

Meanwhile, if the vehicular lamp 10 is turned on as the vehicular headlamp, the diode 508 outputs the signal of H level. In this case, since the NPN transistor 704 becomes on, the NPN transistor 706 becomes off, and the voltage of the node 714 is regulated by the constant voltage power supply 708 and the current designation voltage outputting part 702.

In this case, the switching regulator 204 outputs the supply current corresponding to the voltage of the node 714, and turns on the vehicular lamp 10 as the vehicular headlamp.

The current designation voltage outputting part 702 includes a plurality of diodes 718 coupled in parallel to each other as their anodes are coupled electrically to the node 714 via the resistor 716. The cathodes of the plurality of diodes 718 are coupled electrically to the speed signal outputting unit 104, the temperature signal outputting unit 106, and the illumination signal outputting unit 108 respectively, and receive the speed signal, the temperature signal and the illumination signal respectively. In this case, the current designation voltage outputting part 702 outputs the signal of the lowest voltage among the speed signal, the temperature signal and the illumination signal to the node 714 via the resistor 716.

Accordingly, if the voltage of one of the speed signal, the temperature signal and the illumination signal is lower than the reference voltage outputted by the constant voltage power supply 708, the diode 718 corresponding to this signal reduces the voltage of the node 714 by allowing the current to flow forward. In this case, the current setting part 212 gives the voltage lower than the reference voltage outputted by the constant voltage power supply 708 to the Op-Amp 210. In this case, the switching regulator 204 reduces the supply current corresponding to the low voltage.

Accordingly, the current designation voltage outputting part 702 outputs the voltage indicating the supply current based on the speed signal, the temperature signal and the illumination signal, and changes the supply current. In another embodiment, the current designation voltage outputting part 702 may output the voltage indicating the supply current based on at least one of the speed signal, the temperature signal and the illumination signal.

Here in this embodiment, the node 714 is coupled electrically to the Op-Amp 210 via the low-pass filter 724 including a resistor and a capacitor. Therefore, if the voltage of the node 714 is reduced, the Op-Amp 210 receives the signal whose voltage is reduced gradually from the current setting part 212. In this case, the switching regulator 204 decreases the light of the vehicular lamp 10 gradually by reducing the supply current gradually. Therefore, according to the embodiment, it is possible to prevent the quantity of light of the vehicular lamp 10 from being reduced suddenly.

And, the input and output of the low-pass filter 724 are bypassed by the diode 722 coupled forward from the node 714 towards the Op-Amp 210. Accordingly, if the voltage of the node 714 is increased, the Op-Amp 210 receives the voltage of the node 714 via diode 722. In this case, the switching regulator 204 increases the supply current immediately, and the vehicular lamp 10 can be turned on with necessary quantity of light.

Figure 11:
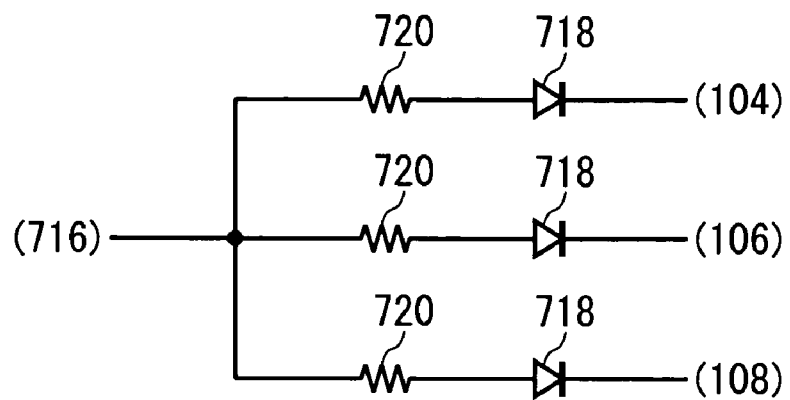
FIG. 11 shows an example of another circuit configuration of a current designation voltage outputting part 702.

FIG. 11 shows an example of another circuit configuration of the current designation voltage outputting part 702. In this embodiment, the current designation voltage outputting part 702 further includes a plurality of resistors 720 each of which is provided between each of the plurality of diodes 718 and the resistor 716 respectively. In this case, the current designation voltage outputting part. 702 gives the voltage to the resistor 716 based on the speed signal, the temperature signal, and the illumination signal. Accordingly, the current designation voltage outputting part 702 outputs the voltage designating the supply current based on the speed of the vehicle, the temperature of the vehicular lamp 10, and the brightness around the vehicle.

The plurality of the resistors 720 may have different resistances respectively. In this case, each of the speed of the vehicle, the temperature of the vehicular lamp 10 and the brightness around the vehicle can contribute with a different ratio to the designation of the supply current. For example, if the supply current is changed corresponding mainly to the speed of the vehicle, the resistor 720 disposed between the speed signal outputting unit 104 and the resistor 716 has a resistance level lower than other resistances of the resistors 720.

Figure 12:
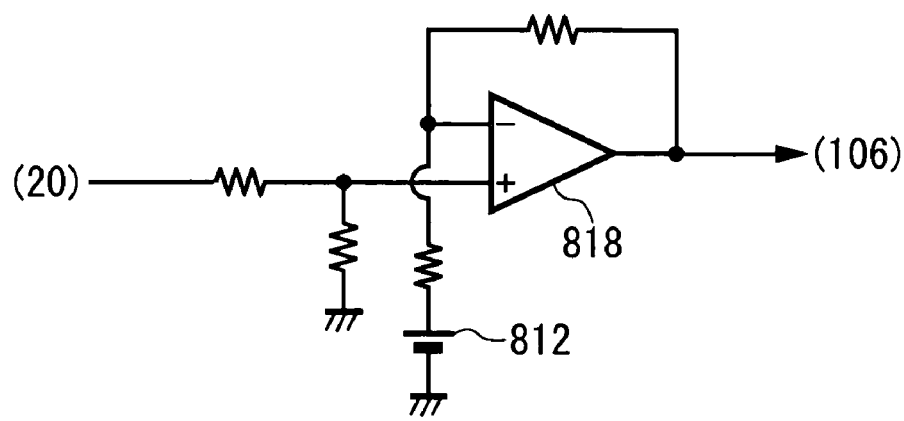
FIG. 12 shows an example of another circuit configuration of a lamp chamber temperature detecting unit 110.

FIG. 12 shows an example of another circuit configuration of the lamp chamber temperature detecting unit 110. In this embodiment, the lamp chamber temperature detecting unit 110 includes a constant voltage power supply 812, an Op-Amp 818 and a plurality of resistors. The constant voltage power supply 812 gives a predetermined reference voltage to the inverting input of the Op-Amp 818 via a resistor.

The Op-Amp 818 is negatively feeding back its output via a resistor. In addition, the non-inverting input of the Op-Amp 818 is coupled electrically to the light source unit 20 via a resistor, and receives the forward voltage of the light emitting diodes 10a to 100c via the resistor. The non-inverting input of the Op-Amp 818 is further grounded via a resistor. Accordingly, the Op-Amp 818 outputs a voltage resulting from amplifying the difference between the forward voltage of the light emitting diodes 100 and the reference voltage outputted by constant voltage power supply 812 to temperature signal outputting unit 106.

Here, the forward voltage of the light emitting diodes 100 is decreased as the light emitting diodes 100 become hot in temperature. And in this embodiment, the constant voltage power supply 812 outputs a voltage lower than the forward voltage of the light emitting diodes 100. In this case, the Op-Amp 818 gives the signal whose voltage is decreased as the temperature of the light emitting diode 100 increases to the temperature signal outputting unit 106. Therefore, according to this embodiment, the temperature of the light emitting diodes 100 can be properly detected.

Furthermore, in this embodiment, the temperature signal outputting unit 106 generates the signal whose voltage is decreased as the temperature of the light emitting diodes 100 increases based on this signal, and gives this signal to the temperature comparing unit 404 described in relation to FIG. 8.

Here, the forward characteristics of the light emitting diodes 100 might be largely different from each other. Therefore, in this embodiment, it is preferable to use the light emitting diodes 100 whose forward voltage characteristics are within a constant range, as they are selected through a predetermined test. In this case, the temperature of the light emitting diodes 100 can be further properly detected. In addition, the reference voltage outputted by the constant voltage power supply 812 may be adjusted corresponding to the deviation of the forward voltage.

Figure 13:
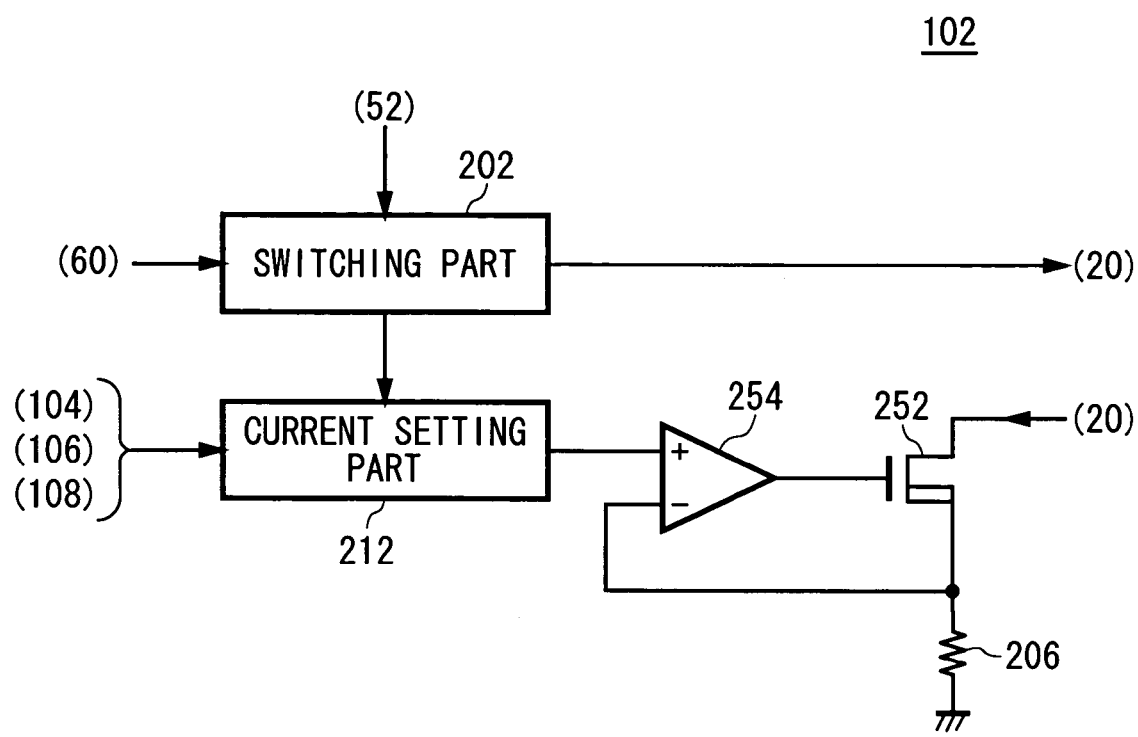
FIG. 13 shows an example of another circuit configuration of a current controlling unit 102.

FIG. 13 shows an example of another circuit configuration of the current controlling unit 102. The current controlling unit 102 in this embodiment includes an Op-Amp 254, an NMOS transistor 252, a switching part 202, a current setting part 212 and a resistor 206.

The Op-Amp 254 receives the output of the current setting part 212 and the voltage of an end of resistor 206 near the plurality of light emitting diodes 100a to 100c (c.f. FIG. 3) through its non-inverting and inverting inputs respectively. Accordingly, the Op-Amp 254 compares the magnitude of the supply current set by the current setting part 212 with the magnitude of the supply current supplied to the plurality of light emitting diodes 100a to 100c, and gives the comparison result to the gate terminal of the NMOS transistor 252. Further, the light emitting diodes 100a to 100c are included in the light source unit 20.

The NMOS transistor 252 is coupled in series to the plurality of emitting diodes 100a to 100c downstream thereof, and regulates the supply current flowing through the plurality of light emitting diodes 100a to 100c corresponding to the output of the Op-Amp 254 received through the gate terminal thereof. Even in this embodiment, the supply current given to the light emitting diodes 100a to 100c can be properly changed. In addition, according to this embodiment, even if the output voltage of the battery 60 is changed, the stable supply current can be given to the light emitting diodes 100a to 100c.

Furthermore, in this embodiment, the switching part 202 gives the power received from the battery 60 (c.f. FIG. 3) directly to the light emitting diodes 100a to 100c in place of the switching regulator 204 (c.f. FIG. 9). The resistor 206 is coupled in series to the light emitting diodes 100a to 100c with the NMOS transistor 252 being therebetween. Except the points described above, the configuration in FIG. 13 given the same symbols as those in FIG. 9 has the same function as that in FIG. 9, and thus it won't be described.

In this embodiment, the current controlling unit 102 has a function of a constant current output circuit for outputting a predetermined supply current by performing a feedback control based on the result of detecting the outputted supply current. Therefore, according to this embodiment, the supply current can be regulated highly accurately.

Figure 14:
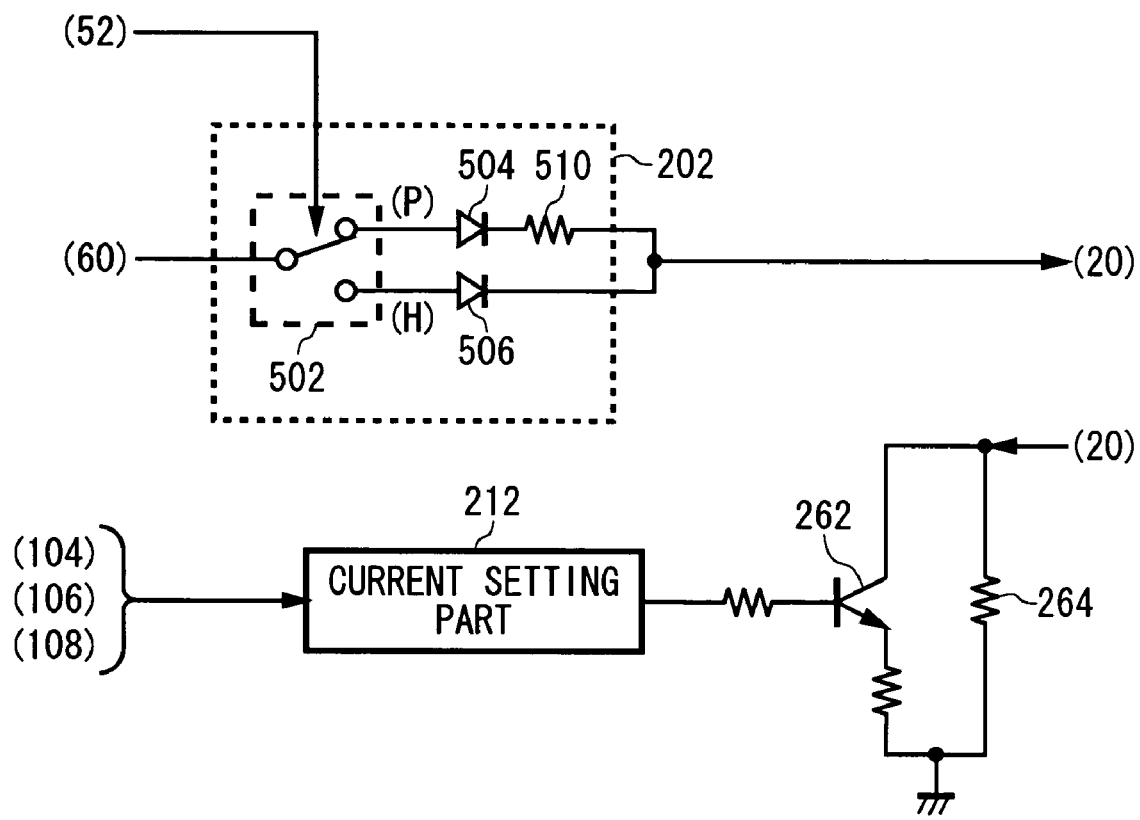
FIG. 14 shows an example of further another circuit configuration of a current controlling unit 102.

FIG. 14 shows an example of further another circuit configuration of the current controlling unit 102. The current controlling unit 102 includes a switching part 202, an NPN transistor 262, a current setting part 212, and a plurality of resistors.

The switching part includes a changeover switch 502, a plurality of diodes 504 and 506 and a resistor 510. In this embodiment, the cathode of the diode 504 is coupled electrically to the cathode of the diode 506 via the resistor 510. In addition, in this embodiment, the output of the switching part 202 is coupled electrically and directly to the light emitting diodes 100a to 100c (c.f. FIG. 3) included in the light source unit 20 in place of the switching regulator 204 (c.f. FIG. 9).

Therefore, if the vehicular lamp 10 (c.f. FIG. 3) is turned on as the position lamp, the light emitting diodes 100a to 100c are coupled electrically to the battery 60 via the resistor 510. Accordingly, the current controlling unit 102 reduces the supply current supplied to the light emitting diodes 100a to 100c.

The resistor 264 and the NPN transistor 262 are coupled in series to the light emitting diodes 100a to 100c and thereby regulate the supply current supplied to the light emitting diodes 100a to 100c. The resistor 264 is grounding the light emitting diodes 100a to 100c downstream thereof.

The NPN transistor 262, which is an emitter follower, is coupled in parallel to the resistor 264 downstream of the light emitting diodes 10a to 100c. In addition, the emitter terminal of the NPN transistor 262 is grounded via the resistor. Accordingly, if the NPN transistor 262 becomes on, it increases the supply current supplied to the light emitting diodes 100a to 100c.

The current setting part 212 sets the magnitude of the supply current based on the speed signal, the temperature signal and the illumination signal received from the speed signal outputting unit 104, the temperature signal outputting unit 106 and the illumination signal outputting unit 108 respectively, and gives the voltage corresponding to the magnitude of the supply current which has been set to the base terminal of the NPN transistor 262 via the resistor.

The current setting part 212 reduces the base voltage of the NPN transistor 262 and makes the NPN transistor 262 off, and thereby reduces the supply current. Even in this case, the supply current given to the light emitting diodes 100a to 100c can be properly changed. In addition, according to the embodiment, the current controlling unit 102 is configured as a simple circuit, and thereby the cost of the vehicular lamp 10 can be reduced. Furthermore, except the points described above, the configuration in FIG. 14 given the same symbols as those in FIG. 9 has the same function as that in FIG. 9, and thus it won't be described.

Figure 15:
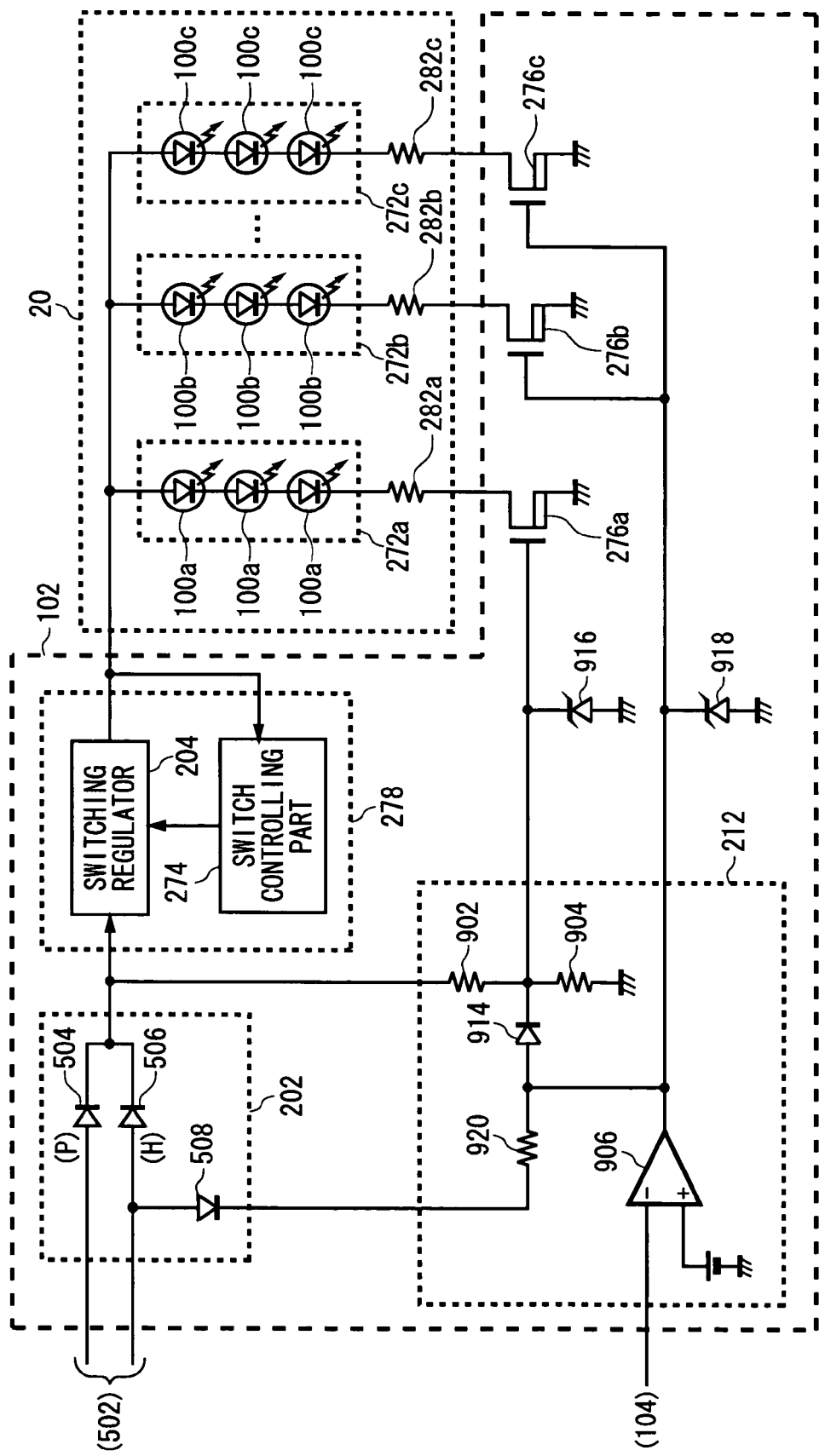
FIG. 15 shows an example of another circuit configuration of a light source unit 20 and a current controlling unit 102.

FIG. 15 shows an example of another circuit configuration of the light source unit 20 and the current controlling unit 102. The light source unit 20 in this embodiment includes a plurality of LED arrays 272a to 272c and a plurality of resistors 282a to 282c. The plurality of LED arrays 272a to 272c is coupled in parallel, and receives the voltage outputted by the current controlling unit 102.

Each of the LED arrays 272a to 272c includes a plurality of light emitting diodes 100a to 100c coupled in series. Therefore, the light source unit 20 includes pluralities of light emitting diodes 100a to 100c coupled in parallel. The pluralities of light emitting diodes 100a to 100c may be included in the different light source units 20 respectively.

Each of the plurality of resistors 282a to 282c is arranged corresponding to the plurality of LED arrays 272a to 272c and coupled in series to the LED array 272 downstream of the corresponding LED array 272. Accordingly, the resistors 282 regulate the current flowing through the corresponding LED arrays 272.

The current controlling unit 102 includes a switching part 202, a current supplying part 278, a plurality of NMOS transistors 276a to 276c, a plurality of zener diodes 916 and 918, and a current setting part 212. In this embodiment, the switching part 202 is coupled to a changeover switch 502 provided outside the vehicular lamp 10 via a pair of wirings. And, the switching part 202 receives the output voltage of the battery 60 (c.f. FIG. 3) from the changeover switch 502 through either a terminal (P) or (H), and transfers an instruction indicating which to turn on the vehicular lamp 10 as the vehicular headlamp or the position lamp corresponding to this. In addition, the switching part 202 supplies the power received from the battery 60 to the current supplying part 278.

The current supplying part 278 includes a switch controlling part 274 and a switching regulator 204. The switch controlling part 274 performs a feedback control on the switching regulator 204 based on the output voltage of the switching regulator 204, and outputs a predetermined voltage to the switching regulator 204. The switching regulator 204 outputs the voltage based on the power received from the battery 60 via the switching part 202. The switching regulator 204 gives the voltage to each of the plurality of LED arrays 272a to 272c, and thereby supplies the supply current to the plurality of light emitting diodes 100a to 100c.

Each of the plurality of NMOS transistors 276a to 276c, which is provided corresponding to each of the plurality of LED arrays 272a to 272c, is coupled in series to the corresponding LED array 272 via the resistor 282. If the gate terminal receives the H signal, the NMOS transistor 276 becomes on, and then allows current to flow through the corresponding LED array 272. Meanwhile, if the gate terminal receives the L signal, the NMOS transistor 276 becomes off, and blocks current flowing through the corresponding LED array 272. Accordingly, the plurality of NMOS transistors 276a to 276c regulates the supply current flowing through the plurality of light emitting diodes 100a to 100c.

The zener diode 916 is provided to protect the gate breakdown voltage of the NMOS transistor 276a. In addition, the zener diode 918 is provided to protect the gate breakdown voltage of the NMOS transistors 276b and 276c.

The current setting part 212 is an example of a selecting part for selecting all or a part of the plurality of light emitting diodes 100a to 100c. In this embodiment, the current setting part 212 includes a plurality of resistors 902 and 904, a diode 914, and an Op-Amp 906.

The plurality of resistors 902 and 904 divides the output voltage of the battery 60 received via the diode 504 or 506, and gives it to the gate terminal of the NOMS transistor 276a. Accordingly, whichever the vehicular lamp 10 is turned on as the position lamp or the vehicular headlamp, the current setting part 212 gives the H signal to the gate terminal of the NOMS transistor 276a, and thereby the NMOS transistor 276a becomes on. In this case, the NOMS transistor 276a allows current to flow through the LED array 272a, and turns on the plurality of light emitting diodes 100a included in that.

In addition, the resistor 920 is coupled electrically to the gate terminals of both the NOMS transistors 276b and 276c and to the cathode of the diode 508. Here, the diode 508 outputs the H signal when the vehicular lamp 10 is turned on as the vehicular headlamp, and outputs the L signal when the vehicular lamp 10 is turned on as the position lamp.

Accordingly, if the vehicular lamp 10 is turned on as the position lamp, the current setting part 212 makes the plurality of NMOS transistors 276b and 276c off, and blocks the current flowing through the plurality of LED arrays 272b and 272c. Therefore, the current setting part 212 lessens the light of the vehicular lamp 10. According to this embodiment, the vehicular lamp 10 can be properly switched and turned on as the vehicular headlamp or the position lamp.

In this way, the current setting part 212 selects all or a part of the light emitting diodes 100 among the plurality of semiconductor light emitting elements 100 based on the instruction of the driver of the vehicle. If the current setting part 212 selects a part of the light emitting diodes 100a, it supplies current to the light emitting diodes 100a selected by the current setting part 212, and thereby reduces the supply current and causes the light emitting diodes 100a to generate the light used for the position lamp.

Hereinafter, the situation where the vehicular lamp 10 is turned on as the vehicular headlamp will be described in further detail. In this embodiment, the gate terminals of the plurality of NMOS transistors 276b and 276c are coupled electrically to the output of the Op-Amp 906.

The Op-Amp 906 has the same function as that of the comparator 836 described in relation to FIG. 8. Therefore, if the speed of the vehicle is lower than a predetermined level, the Op-Amp 906 allows its output to sink current. In this case, the plurality of NMOS transistors 276b and 276c becomes off, the current flowing through the plurality of LED arrays 272b and 272c is blocked. Meanwhile, if the speed of the vehicle is higher than or equal to the predetermined level, the plurality of NMOS transistors 276b and 276c becomes on, and the current flows through the plurality of LED arrays 272b and 272c.

Therefore, if the speed of the vehicle is higher than or equal to the predetermined level, the current setting part 212 selects all of the light emitting diodes 100a to 100c. Meanwhile, if the speed of the vehicle is lower than the predetermined level, the current setting part 212 selects a part of the light emitting diodes 100a among the plurality of light emitting diodes 100a to 100c. The current supplying part 278 supplies current to the light emitting diodes 100 selected by the current setting part 212, and thereby changes the supply current based on the speed of the vehicle. Therefore, according to this embodiment, the quantity of light of the vehicular lamp 10 can be changed corresponding to the speed of the vehicle.

In addition, the NMOS transistor 276a here is coupled electrically to the resistor 920 via the diode 914. In this case, if the vehicular lamp 10 is turned on as the vehicular headlamp using a resistor whose resistance is smaller than that of the resistor 920 in place of the resistor 920, the current setting part 212 supplies the gate terminal of the NMOS transistor 276a with a higher voltage than that in the case of turning on the vehicular lamp 10 as the position lamp. Accordingly, if the vehicular lamp 10 is turned on as the vehicular headlamp, the current setting part 212 allows more current to flow through the light emitting diodes 100a, and turns on the vehicular lamp 10 with more brightness.

Furthermore, except the points described above, the configuration in FIG. 15 given the same symbols as those in FIG. 9 has the same function as that in FIG. 9, and thus it won't be described. In another embodiment, the Op-Amp 906 may receives the temperature signal or the illumination signal in place of the speed signal from the temperature signal outputting unit 106 or the illumination signal outputting unit 108 (c.f. FIG. 3). In this case, the Op-Amp 906 allows its output to sink current, if the temperature of the vehicular lamp 10 is higher than the threshold temperature or if the brightness around the vehicle is higher than a predetermined level. In addition, the current setting part 212 may include a plurality of Op-Amps 906 coupled in parallel, each of which receives the speed signal, the temperature signal and the illumination signal respectively.

As is obvious from the description above, according to the present invention, it is possible to turn on a vehicular lamp properly.

The vehicular lamp to which the present invention may be applied includes, but not limited to, a headlamp, turn-signal lamp, tail lamp, and the headlamp includes, but not limited to, a regular headlamp, fog lamp and cornering lamp, of automobiles, motorcycles, trains and the like.

Although the present invention has been described by way of exemplary embodiments, it should be understood that those skilled in the art might make many changes and substitutions without departing from the spirit and the scope of the present invention which is defined only by the appended claims.

What is claimed is:

1. A vehicular lamp used for a vehicle, comprising: a semiconductor light emitting element for generating light used for a vehicular headlamp to emit said light forward from said vehicle; and a current controlling unit for reducing the current supplied to said semiconductor light emitting element for switching the vehicular lamp to a position lamp and to prevent the temperature in the lamp from increasing during a course of time that the vehicular lamp is turned on as the vehicular headlamp, wherein said current controlling unit reduces said current, if said vehicle is stopped.

2. The vehicular lamp as claimed in claim 1 comprising:
a plurality of said semiconductor light emitting elements coupled in parallel, wherein said current controlling unit comprises:
a selecting unit for selecting all or a part of said plurality of semiconductor light emitting elements based on an instruction of said driver of said vehicle; and
a current supplying unit for allowing a part of said plurality of semiconductor light emitting elements to emit said light used for said position lamp by reducing currents supplied to said semiconductor light emitting elements, if said selecting unit selects said part of semiconductor light emitting elements by supplying currents to said selected semiconductor light emitting elements.

3. The vehicular lamp as claimed in claim 1, wherein said current controlling unit reduces a current supplied to said semiconductor light emitting element based on at least one of a speed of the vehicle, a temperature of a vehicular lamp, and a brightness around the vehicle during the course that a vehicular lamp is turned on as a vehicular headlamp.

4. The vehicular lamp as claimed in claim 3 comprising:
a plurality of said semiconductor light emitting elements coupled in parallel, wherein said current controlling unit comprises:
a selecting unit for selecting all or a part of said plurality of semiconductor light emitting elements; and
a current supplying unit for allowing a part of said plurality of semiconductor light emitting elements to emit said light used for said position lamp by reducing currents supplied to said semiconductor light emitting elements, if said selecting unit selects said part of semiconductor light emitting elements by supplying currents to said selected semiconductor light emitting elements.

* * * * *